United States Patent
Ikeda et al.

(10) Patent No.: US 8,578,121 B2
(45) Date of Patent: Nov. 5, 2013

(54) COMPUTER SYSTEM AND CONTROL METHOD OF THE SAME

(75) Inventors: Hirokazu Ikeda, Yamato (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 378 days.

(21) Appl. No.: 12/989,294

(22) PCT Filed: Apr. 30, 2010

(86) PCT No.: PCT/JP2010/003102
§ 371 (c)(1),
(2), (4) Date: Oct. 22, 2010

(87) PCT Pub. No.: WO2011/135636
PCT Pub. Date: Nov. 3, 2011

(65) Prior Publication Data
US 2011/0271073 A1    Nov. 3, 2011

(51) Int. Cl.
*G06F 12/00* (2006.01)
(52) U.S. Cl.
USPC .................. 711/170; 711/114; 711/E12.002
(58) Field of Classification Search
USPC .......................................... 711/170, E12.002
See application file for complete search history.

(56) References Cited

U.S. PATENT DOCUMENTS

| | | | |
|---|---|---|---|
| 2006/0253549 A1* | 11/2006 | Arakawa et al. | 709/217 |
| 2007/0038748 A1* | 2/2007 | Masuyama | 709/225 |
| 2007/0192558 A1* | 8/2007 | Honda et al. | 711/165 |
| 2009/0049241 A1 | 2/2009 | Ohno et al. | |
| 2009/0300285 A1 | 12/2009 | Nagai et al. | |
| 2011/0252274 A1* | 10/2011 | Kawaguchi et al. | 714/6.2 |

FOREIGN PATENT DOCUMENTS

| JP | 2004-005370 A | 1/2004 |
|---|---|---|
| JP | 2007-066259 A | 3/2007 |

* cited by examiner

*Primary Examiner* — Reginald Bragdon
*Assistant Examiner* — Mehdi Namazi
(74) *Attorney, Agent, or Firm* — Volpe and Koenig, P.C.

(57) ABSTRACT

Problem To recover data of a virtual volume to which an external volume was assigned even if an unusual status occurs in the first storage apparatus.
Solution The controller of the storage apparatus, to the respective pages of the pool corresponding to the virtual volumes, assigns the internal pool volumes configured of storage devices of the storage apparatus or the external pool volumes configured of storage devices of the storage apparatus, and the management server stores the configuration information indicating the correspondence relationship between the external pool volumes assigned to the respective pages of the pool and the virtual volumes, in the case of a total functional shutdown of the storage apparatus, creates a virtual volume and a pool in the storage apparatus, associates the virtual volume with the external pool volume in accordance with the stored configuration information, provides the virtual volume to the host computer and instructs path switching.

13 Claims, 36 Drawing Sheets

FIG.10

| STORAGE APPARATUS 150 | EXTERNAL CONNECTION FUNCTION 152 | FAILURE LEVEL 154 | EFFECTIVE LINE SPEED 156 | GUARANTEED LINE SPEED 158 | EXTERNALLY CONNECTED COMMUNICATION VOLUME 160 | MANAGEMENT SERVER 162 |
|---|---|---|---|---|---|---|
| STORAGE APPARATUS 1 | ENABLED | TOTAL FUNCTIONAL SHUTDOWN | 300Mbps | 100Mbps | 20Mbps | MANAGEMENT SERVER 1 |
| STORAGE APPARATUS 2 | DISABLED | NORMAL | 500Mbps | 100Mbps | — | MANAGEMENT SERVER 2 |
| ... | ... | ... | ... | ... | ... | ... |

| STORAGE APPARATUS 150 | EXTERNAL CONNECTION FUNCTION 152 | FAILURE LEVEL 154 | EFFECTIVE LINE SPEED 156 | GUARANTEED LINE SPEED 158 | EXTERNALLY CONNECTED COMMUNICATION VOLUME 160 | MANAGEMENT SERVER 162 |
|---|---|---|---|---|---|---|
| STORAGE APPARATUS 1 | ENABLED | LINK DOWN | 300Mbps | 100Mbps | 20Mbps | MANAGEMENT SERVER 1 |
| STORAGE APPARATUS 2 | DISABLED | NORMAL | 500Mbps | 100Mbps | — | MANAGEMENT SERVER 2 |
| ... | ... | ... | ... | ... | ... | ... |

| 150 | 152 | 154 | 156 | 158 | 160 | 162 |
|---|---|---|---|---|---|---|
| STORAGE APPARATUS | EXTERNAL CONNECTION FUNCTION | FAILURE LEVEL | EFFECTIVE LINE SPEED | GUARANTEED LINE SPEED | EXTERNALLY CONNECTED COMMUNICATION VOLUME | MANAGEMENT SERVER |
| STORAGE APPARATUS 1 | ENABLED | LINE QOS VIOLATION | 50Mbps | 100Mbps | 200Mbps | MANAGEMENT SERVER 1 |
| STORAGE APPARATUS 2 | DISABLED | NORMAL | 120Mbps | 100Mbps | — | MANAGEMENT SERVER 2 |
| ... | ... | ... | ... | ... | ... | ... |

| STORAGE APPARATUS | TIER (PRIORITY) | VOLUME TYPE | POOL VOLUME | EXTERNAL STORAGE | EXTERNAL VOLUME | PAGE | VIRTUAL VOLUME |
|---|---|---|---|---|---|---|---|
| STORAGE APPARATUS 1 | TIER (2) | EXTERNAL CONNECTION (SUS) | VOL1 | STORAGE 2 | EXVOL1 | PAGE 1 | VVOL1 |
| | | | | | | PAGE 2 | VVOL1 |
| | | | VOL2 | STORAGE 2 | EXVOL2 | PAGE 3 | VVOL2 |
| | TIER (1) | SUS | VOL3 | -(INTERNAL) | -(INTERNAL) | PAGE 4 | VVOL1 |
| | | | VOL4 | | | PAGE 5 | VVOL4 |
| | TIER (3) | EXTERNAL CONNECTION (SATA) | VOL5 | STORAGE 3 | EXVOL3 | PAGE 6 | VVOL2 |
| | | | | | | PAGE 7 | VVOL2 |
| | | | | | | PAGE 8 | VVOL3 |
| | | | | | | PAGE 9 | VVOL4 |
| ... | ... | ... | ... | ... | ... | ... | ... |

FIG.14

| STORAGE APPARATUS | TIER (PRIORITY) | VOLUME TYPE | POOL VOLUME | PAGE | VIRTUAL VOLUME |
|---|---|---|---|---|---|
| STORAGE APPARATUS 1 | TIER (2) | EXTERNAL CONNECTION (SUS) | VOL1 | PAGE 1 | VVOL1 |
| | | | | PAGE 2 | VVOL1 |
| | | | VOL2 | PAGE 3 | VVOL2 |
| | TIER (1) | SUS | VOL3 | PAGE 4 | VVOL1 |
| | | | | PAGE 5 | VVOL4 |
| | | | VOL4 | PAGE 6 | VVOL2 |
| | TIER (3) | EXTERNAL CONNECTION (SATA) | | PAGE 7 | VVOL2 |
| | | | VOL5 | PAGE 8 | VVOL3 |
| | | | | PAGE 9 | VVOL4 |
| ... | ... | ... | ... | ... | ... |

| STORAGE APPARATUS 210 | VIRTUAL VOLUME 212 | OPERATION HOST 214 | POOL VOLUME 216 | STATUS 218 | RECOVERABILITY 220 |
|---|---|---|---|---|---|
| STORAGE APPARATUS 1 | VVOL1 | HOST 1 | VOL 1 (EXTERNAL) | NORMAL | POSSIBLE |
| | | | VOL 2 (EXTERNAL) | NORMAL | |
| | VVOL2 | HOST 2 | VOL 1 (EXTERNAL) | NORMAL | IMPOSSIBLE |
| | | | VOL 3 (INTERNAL) | FAILURE | |
| | VVOL3 | HOST 3 | VOL 4 (INTERNAL) | FAILURE | IMPOSSIBLE |
| | VVOL4 | HOST 4 | VOL 2 (EXTERNAL) | NORMAL | IMPOSSIBLE |
| | | | VOL 5 (EXTERNAL) | FAILURE | |
| | ... | ... | ... | ... | ... |
| ... | | | | | |

| STORAGE APPARATUS (210) | VIRTUAL VOLUME (212) | OPERATION HOST (214) | POOL VOLUME (216) | STATUS (218) | RECOVERABILITY (220) |
|---|---|---|---|---|---|
| STORAGE APPARATUS 1 | VVOL1 | HOST 1 | VOL 1 (EXTERNAL) | LINK DOWN | POSSIBLE |
| | | | VOL 2 (EXTERNAL) | LINK DOWN | |
| | VVOL2 | HOST 2 | VOL 1 (EXTERNAL) | LINK DOWN | IMPOSSIBLE |
| | | | VOL 3 (INTERNAL) | NORMAL | |
| | VVOL3 | HOST 3 | VOL 4 (INTERNAL) | NORMAL | POSSIBLE |
| | | | VOL 2 (EXTERNAL) | LINK DOWN | |
| | VVOL4 | HOST 4 | VOL 5 (EXTERNAL) | NORMAL | IMPOSSIBLE |
| | ... | ... | ... | ... | ... |
| ... | | | | | |

| Storage Apparatus 210 | Virtual Volume 212 | Operation Host 214 | Pool Volume 216 | Status 218 | Page Reallocation Necessity 222 |
|---|---|---|---|---|---|
| Storage Apparatus 1 | VVOL1 | HOST 1 | VOL 1 (EXTERNAL) | QOS VIOLATION | UNNECESSARY |
| | VVOL2 | HOST 2 | VOL 2 (EXTERNAL) | QOS VIOLATION | |
| | VVOL3 | HOST 3 | VOL 1 (EXTERNAL) | QOS VIOLATION | NECESSARY |
| | | | VOL 3 (INTERNAL) | NORMAL | |
| | VVOL4 | HOST 4 | VOL 4 (INTERNAL) | NORMAL | UNNECESSARY |
| | | | VOL 2 (EXTERNAL) | QOS VIOLATION | |
| | | | VOL 5 (EXTERNAL) | QOS VIOLATION | UNNECESSARY |
| ... | ... | ... | ... | ... | ... |

FIG.28

| STORAGE APPARATUS | STATUS | CAPACITY VIRTUALIZATION | EXTERNAL CONNECTION | MANAGEMENT SERVER | |
|---|---|---|---|---|---|
| STORAGE APPARATUS 1 | NORMAL | POSSIBLE | IMPOSSIBLE | MANAGEMENT SERVER 1 | MASTER |
| STORAGE APPARATUS 2 | FAILURE | POSSIBLE (PAGE REALLOCATION) | POSSIBLE | MANAGEMENT SERVER 2 | SLAVE |
| STORAGE APPARATUS 3 | NORMAL | IMPOSSIBLE | IMPOSSIBLE | MANAGEMENT SERVER 3 | SLAVE |
| STORAGE APPARATUS 4 | NORMAL | POSSIBLE (PAGE REALLOCATION) | POSSIBLE | MANAGEMENT SERVER 4 | MASTER |

FIG.29

| STORAGE APPARATUS 362 | VIRTUAL VOLUME 364 | OPERATION HOST 366 | POOL VOLUME (TIER) 368 | STATUS 370 | RECOVERABILITY 372 |
|---|---|---|---|---|---|
| STORAGE APPARATUS 1 | VVOL1 | HOST 1 | VOL 1, 2, 3 (INTERNAL) | NORMAL | UNNECESSARY |
| | VVOL2 | HOST 1 | VOL 4, 5, 6 (EXTERNAL) | NORMAL | POSSIBLE |
| | VVOL3 | HOST 1 | VOL 4, 5, 6 (EXTERNAL) | NORMAL | IMPOSSIBLE |
| | | | VOL 7, 8, 9 (INTERNAL) | FAILURE | |
| STORAGE APPARATUS 2 | VVOL4 | HOST 2 | VOL 4, 5, 6 (EXTERNAL) | NORMAL | IMPOSSIBLE |
| | | | VOL 7, 8, 9 (INTERNAL) | FAILURE | |
| | VVOL5 | HOST 2 | VOL 10, 11, 12 (EXTERNAL) | NORMAL | POSSIBLE |
| STORAGE APPARATUS 4 | VVOL6 | HOST 3 | VOL 13, 14, 15 (INTERNAL) | NORMAL | UNNECESSARY |

| External connection function providing storage field 374 | | External storage apparatus 376 | | | | External connection function for recovery providing storage apparatus 378 | |
|---|---|---|---|---|---|---|---|
| Storage apparatus | Virtual volume | Storage apparatus | Logical volume | Capacity virtualization | Virtual volume | Storage apparatus | External volume | Virtual volume |
| 380 | 382 | 384 | 386 | 388 | 390 | 392 | 394 | 396 |
| Storage apparatus 2 | VVOL2 | Storage apparatus 1 | VOL16,17,18 | POSSIBLE | VVOL7 | — | — | — |
| | VVOL5 | Storage apparatus 3 | VOL19,20,21 | IMPOSSIBLE | — | Storage apparatus 4 | VOL22,23,24 | VVOL8 |
| ... | ... | ... | ... | ... | ... | ... | ... | ... |

COMPUTER SYSTEM AND CONTROL METHOD OF THE SAME

TECHNICAL FIELD

This invention relates to a computer system comprising multiple storage apparatuses connected to host computers and multiple management servers managing the respective storage apparatuses and a control method of the same.

BACKGROUND ART

A storage apparatus connected to a host computer via a network, as a storage device storing data, for example, comprises multiple magnetic disks. The storage apparatus, by the technology of RAID (Redundant Array of Independent (or Inexpensive) Disks), makes the storage areas of the multiple storage devices redundant and configures a RAID group. Furthermore, the storage apparatus, to the host computer, provides the storage area of the capacity required by the host computer from a part of the RAID group in the form of logical volumes. Generally, logical volumes of the storage apparatus are configured of high-performance and expensive storage devices, configured of low-performance and inexpensive storage devices, or configured of different degrees of redundancy of the RAID configuration, and are used differently depending on usage.

Furthermore, for the storage apparatus, the technology of Thin Provisioning exists. Thin Provisioning is the technology in which [the storage apparatus], instead of providing logical volumes as a storage area in a fixed capacity to the host computer, provides virtual logical volumes (virtual volumes) to the host computer and, in accordance with the data write processing and others from the host computer to the storage apparatus, from a storage area (pool) created of multiple logical volumes, by assignment units of the storage area called pages, assigns storage areas to the virtual volumes. By using the Thin Provisioning technology, the storage capacity to be provided to the host computer can be dynamically extended.

Here, a page is a storage area created by splitting a logical volume configuring the pool (pool volume) by the appropriate capacity with a logical block address (LBA (Logical Block Address)). A page may also be referred to as a segment. Meanwhile, an LBA is the address used, when the host computer reads/writes data from/to the storage apparatus, for specifying the data read/write location in the logical volume provided to the host.

A technology of performing efficient operations in a pool configured of pool volume groups of different performances is proposed (refer to Patent Literature 1). In this technology, the management server or the storage apparatus monitors the access status (e.g. the number of times of read/write per unit of time (IOPS) and others) of each page assigned to the virtual volumes. With reference to the access status of the monitored pages, the pages of high frequencies of use are dynamically migrated to the storage area in the pool volume configured of expensive and highly-reliable storage devices, and the pages of low frequencies of use are dynamically migrated to the storage area in the pool volume configured of low-cost storage devices. By this method, the deterioration of the performance and reliability of the virtual volume and the increase of the operation cost of the storage apparatus can be prevented.

Meanwhile, a storage system wherein, for example, in addition to a first storage apparatus comprising a first storage device storing data whose access frequency is high and others, a second storage apparatus comprising a second storage device storing data whose access frequency is low and others is installed, the first storage apparatus and the second storage apparatus are connected via the communication network and, if the first storage apparatus receives a first data input/output request from the host computer and determines that the first data input/output request is not assigned to the same, [the first storage apparatus] converts the first data input/output request into a second data input/output request and sends the converted second data input/output request to the second storage apparatus via the communication network, and the second storage apparatus, in accordance with the second data input/output request, performs the data input/output processing for the second storage device is proposed (refer to Patent Literature 2).

By using the technology described in Patent Literature 2, what is called an externally connected function, even in the cases where a new storage apparatus is installed in [addition to] an existing storage apparatus, the old storage apparatus can be efficiently utilized without any specification change or modification.

Here, in configuring a storage system including the first storage apparatus and the second storage apparatus, by registering the logical volumes configured of the first storage devices belonging to the first storage apparatus in the pool as internal logical volumes and registering the logical volumes configured of the second storage devices belonging to the second storage apparatus in the pool as external logical volumes, the pool in which the internal logical volumes and the external logical volumes are mixed can be configured.

That is, in configuring the storage system including the first storage apparatus and the second storage apparatus, by combining the technology described in Patent Literature 1 and the technology described in Patent Literature 2, to each page to which an internal logical volume or an external logical volume is assigned, it is possible to assign the storage area of the same to the virtual volumes, and it is also possible to perform the appropriate page allocation complying with the characteristic of the media.

CITATION LIST

Patent Literature

PTL 1: Japanese Unexamined Patent Application Publication No. 2007-66259

PTL 2: Japanese Unexamined Patent Application Publication No. 2004-5370

SUMMARY OF INVENTION

Technical Problem

However, even if the storage system including the first storage apparatus connected to the host computer via the network and the second storage apparatus connected to the first storage apparatus via the network is simply configured, if a failure or others occurs in the first storage apparatus and the virtual volume configured in the first storage apparatus cannot be used, even if the second storage apparatus is normal, the host computer cannot utilize all the data of the pages to which the internal logical volumes or the external logical volumes are assigned.

That is, as the data whose access target is virtual volumes is appropriately distributed and allocated to internal logical volumes or external logical volumes by page reallocation, even if the external logical volumes are normal, if the correspondence relationship between the pages of the virtual volumes and the external logical volumes is not clear, the data in the external logical volumes cannot be utilized.

This invention was devised in view of the problems of the above-mentioned technologies, and an object of this invention is, in the storage system where the second storage apparatus is externally connected to the first storage apparatus via the network and logical devices configured of the storage devices of the second storage apparatus are virtualized and assigned to the first storage apparatus as external logical volumes, to provide a computer system in which, even if a failure occurs in the first storage apparatus, the data of the virtual volumes to which the external logical volumes were assigned can be recovered and a control method of the same.

Solution to Problem

To achieve the above-mentioned object, this invention is characterized in that at least one management server among multiple management servers managing multiple storage apparatuses, if an unusual status occurs in a first storage apparatus among the multiple storage apparatuses, creates a second virtual volume corresponding to a first virtual volume created in the first storage apparatus in a second storage apparatus externally connected to the first storage apparatus, in accordance with the information acquired from the first storage apparatus which is the configuration information indicating the correspondence relationship between the first virtual volume and an external logical volume configured of a storage device of the second storage apparatus, associates the second virtual volume with an internal logical volume in the second storage apparatus which was assigned as the external logical volume to the first storage apparatus and, to the access request source whose access target is the first virtual volume, provides the second virtual volume to which the external logical volume is assigned as a new access target as well as instructs path switching.

Advantageous Effects of Invention

According to this invention, even if a failure occurs in the first storage apparatus, the data of the virtual volumes to which the external logical volumes externally connected to the first storage apparatus and configured of the storage devices of the second storage apparatus are assigned can be recovered.

BRIEF DESCRIPTION OF DRAWINGS

FIG. 10 is a configuration diagram of a storage failure management table in the case of a total functional shutdown.

FIG. 11 is a configuration diagram of the storage failure management table in the case of a link down.

FIG. 12 is a configuration diagram of the storage management table in the case of a line QoS violation.

FIG. 13 is a configuration diagram of a page/external volume correspondence management table.

FIG. 14 is a configuration diagram of a page allocation management table.

FIG. 15 is a configuration diagram of a virtual volume recoverability determination table in the case of a total functional shutdown.

FIG. 16 is a configuration diagram of the virtual volume recoverability determination table in the case of a link down.

FIG. 17 is a configuration diagram of the virtual volume recoverability determination table in the case of a line QoS violation.

FIG. 28 is a configuration diagram of the storage failure management table.

FIG. 29 is a configuration diagram of the virtual volume recoverability determination table.

FIG. 30 is a configuration diagram of a virtual volume recovery policy table.

DESCRIPTION OF EMBODIMENTS

In this embodiment, among a first management server managing a first storage apparatus and a second management server managing a second storage apparatus, the second management server stores the configuration information indicating the correspondence relationship between a first virtual volume set for the first storage apparatus and an external logical volume configured of storage devices in the second storage apparatus and, if an unusual status occurs in the system including the first storage apparatus 1 and the second management server, creates a second virtual volume in the second storage apparatus, in accordance with the stored configuration information, associates the second virtual volume and an internal logical volume in the second storage apparatus which was assigned to the first storage apparatus as an external logical volume, provides the second volume to the host computer whose access target is the first virtual volume, and recovers the data of the virtual volume to which the external logical volume was assigned.

Figure 1:
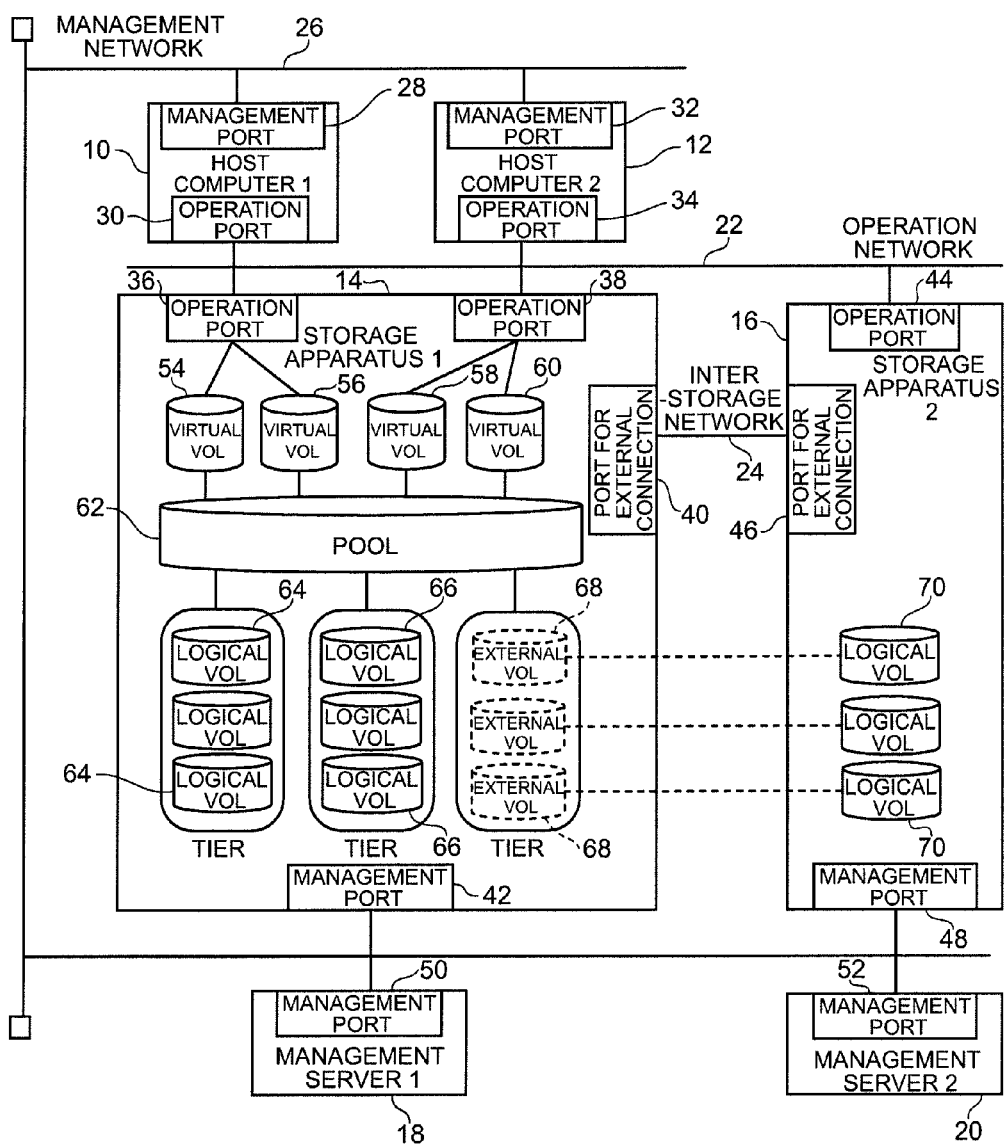
FIG. 1 is a block diagram of the computer system in the first embodiment.

Hereinafter, an embodiment of this invention is described with reference to the drawings. FIG. 1 is a block configuration diagram of the computer system to which this invention is applied. In FIG. 1, the computer system comprises a host computer (first host computer) 10, a host computer (second host computer) 12, a storage apparatus (first storage apparatus) 14, a storage apparatus (second storage apparatus) 16, a management server (first management server) 18, and a management server (second management server) 20.

The host computers 10, 12 are connected to each other via an operation network 22, and are also connected to the storage apparatuses 14, 16 via the operation network 22. The storage apparatuses 14, 16 are connected to each other via the operation network 22, and are also connected to each other via an inter-storage network 24. The management servers 18, 20 are connected to each other via a management network 26, and are also connected to the storage apparatuses 14, 16 respectively. As the operation network 22, the inter-storage network 24, and the management network 26, for example, an FC (Fibre Channel) network can be used.

The host computer 10 comprises a management port 28 and an operation port 30, and the management port 28 is connected to the management network 26 while the operation port 30 is connected to the operation network 22. The host computer 12 comprises a management port 32 and an operation port 34, and the management port 32 is connected to the management network 26 while the operation port 34 is connected to the operation network 22.

The storage apparatus 14 comprises operation ports 36, 38, a port for external connection 40, and a management port 42, wherein the operation ports 36, 38 are connected to the operation network 22 respectively, the port for external connection 40 is connected to the inter-storage network 24, and the management port 42 is connected to the management network 26.

The storage apparatus 16 comprises a management port 44, a port for external connection 46, and a management port 48, wherein the operation port 44 is connected to the operation network 22, the port for external connection 46 is connected to the inter-storage network 24, and the management port 48 is connected to the management network 26. Note that the ports for external connection 40, 46 may also be connected to the operation network 22 respectively instead of being connected to the inter-storage network 24.

The management server 18 comprises a management port 50, and the management server 20 comprises a management port 52, wherein the management port 50 is connected to the management network 26, and the management port 52 is connected to the management network 26.

The storage apparatus 14, for sending/receiving information to/from the host computers 10, 12 as the access request sources via the operation network 12, comprises multiple virtual volumes 54, 56 comprising virtual storage areas as logical volumes to be the access target of the host computer 10 and multiple virtual volumes 58, 60 comprising virtual storage areas as logical volumes to be the access target of the host computer 12, wherein the virtual volumes 54, 56 are connected to the operation port 36 and the virtual volumes 58, 60 are connected to the operation port 38.

Each of the virtual volumes 54 to 60, in the initial period without any access from the host computers 10, 12, is in the status in which no logical volume or page is assigned to the virtual storage area of the same. Meanwhile, if, from the host computers 10, 12 to each of the virtual volumes 54 to 60, as an access request, for example, a write access is input, at the timing of the write access, by a capacity virtualization control function (a processing function by starting up the capacity virtualization control program), the virtual storage area of each of the virtual volumes 54 to 60 is split into multiple blocks and, to each of the blocks, a logical volume registered in a pool 62 is assigned. That is, by using the Thin Provisioning technology of, in accordance with the write access from the host computers 10, 12 to each of the virtual volumes 54 to 60, assigning storage areas to the virtual volumes 54 to 60 from the pool 62, the storage capacity to be provided to the host computers 10, 12 is extended dynamically.

For example, if multiple pages are assigned to the pool 62, to each block of the virtual volumes 54 to 60, the multiple pages assigned to the pool 62 are made to correspond and, to each of the pages, from the logical volume created in storage devices (storage media), the storage areas of the same are assigned.

As more specifically described, if a storage device belonging to a tier 1 is configured of multiple SSDs (Solid State Drives), a part or all of the multiple logical volumes 64 created in the storage area of each SSD are, as internal logical volumes or internal pool volumes, assigned to any of the pages.

Furthermore, if a storage device belonging to a tier 2 is configured of multiple SUS's, a part of the multiple logical volumes 66 created in the storage area of each SUS are, as internal logical volumes or internal pool volumes, assigned to any of the pages.

Furthermore, if a storage device belonging to a tier 3 is configured of multiple SATA (Serial ATA) Disks (hereinafter also referred to as SATAs) and each SATA is allocated in the storage apparatus 16, a part of the multiple external volumes 68 are, as external logical volumes or external pool volumes, assigned to any of the pages.

In this case, the multiple external volumes 68 are configured as the volumes as the volumes belonging to the storage apparatus 14 created by virtualizing the multiple logical volumes 70 created in the storage areas of the multiple SATAs which are the storage devices of the storage apparatus 16, both of which are made to correspond to each other. Therefore, in response to access requests to the external volumes 68, the data input/output processing will be performed for the storage devices of the storage apparatus 16.

Figure 2:
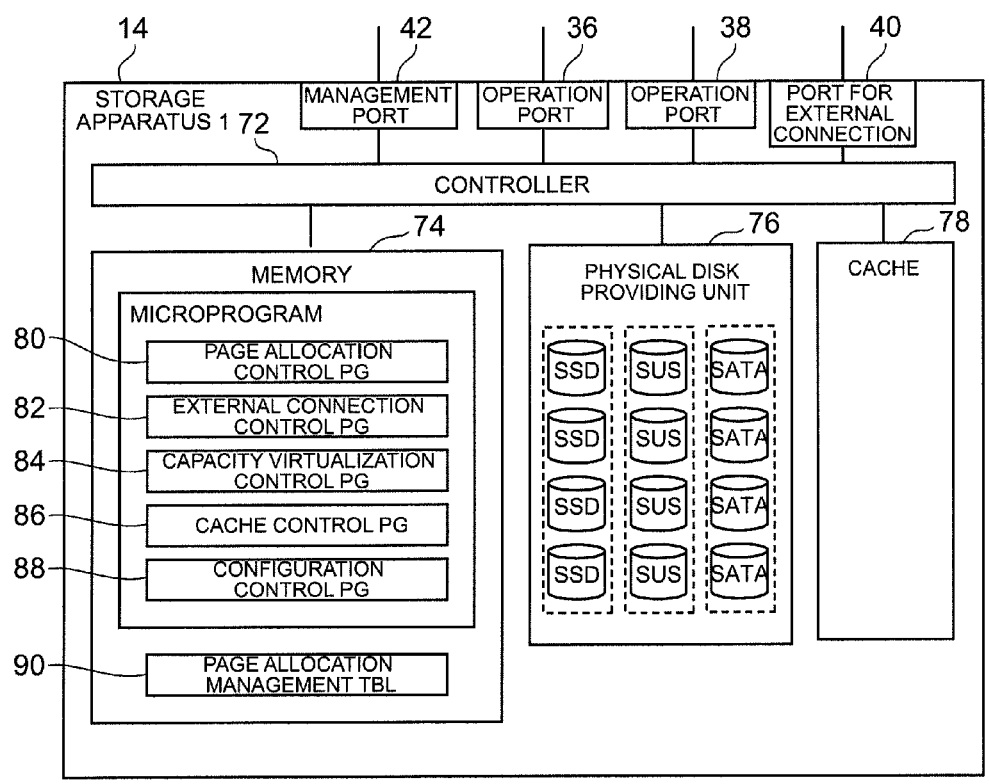
FIG. 2 is a block configuration diagram of a storage apparatus.

Next, the configuration of the storage apparatus 14 is shown in FIG. 2. In FIG. 2, the storage apparatus 14 comprises, in addition to the management port 42, the operation ports 36, 38, and the port for external connection 40, a controller 72, a memory 74, a physical disk providing unit 76, and a cache (cache memory) 78.

The controller 72 comprises a processor (CPU) for the integrated control of the entire storage apparatus 14, performs various types of processing in accordance with the programs stored in the memory 74, sends/receives information to/from the management servers 18, 20 via the management port 42 as well as sending/receiving information to/from the host computers 10, 12 via the operation ports 36, 38, and controls the data input/output processing for the storage devices in the storage apparatus 14 as well as controlling the data input/output processing for the storage devices in the storage apparatus 16 via the port for external connection 40.

In the memory 74, as microprograms, a page allocation control program 80, an external connection control program 82, a capacity virtualization control program 84, a cache control program 86, and a configuration control program 88 are stored while a page allocation management table 90 is stored.

The physical disk providing unit 76, as the first storage devices, for example, comprises multiple SSDs, multiple SUS's, and multiple SATAs, and each of the respective storage devices, as an array group, for example, configures a RAID group. Furthermore, these storage devices, whose response speeds are different from each other, are hierarchized; e.g. the SSDs are configured as the storage devices belonging to the tier 1, the SUS's are configured as the storage devices belonging to the tier 2, and the SATAs are configured as the storage devices belonging to the tier 3.

The cache memory 78 configures a storage area for temporarily storing the data accompanying the processing by the controller 70.

Figure 3:
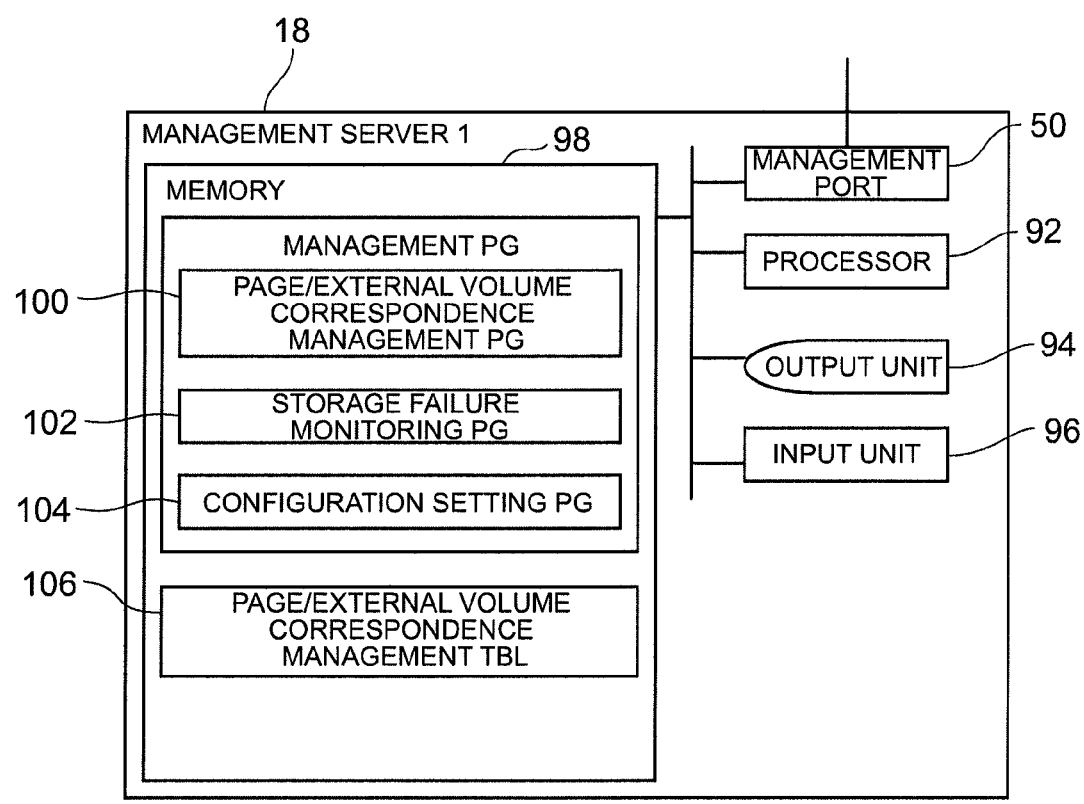
FIG. 3 is a block configuration diagram of a management server 1.

Next, the configuration of the management server 18 is shown in FIG. 3. In FIG. 3, the management server 18 is configured of, in addition to the management port 50, a processor 92, an output unit 94 configured of a display device, an input unit 96 configured of input devices such as a mouse, and a memory 98.

In the memory 98, as management programs, a page/external volume correspondence management program 100, a storage failure monitoring program 102, and a configuration setting program 104 are stored while a page/external volume correspondence management table 106 is stored. Note that the specific contents of these programs and the table are described later.

The processor 92, in addition to performing the integrated control of the entire management server 18, performs various types of processing in accordance with the programs stored in the memory 98, performs the processing such as the configuration setting for the storage apparatus 14 via the management port 50, and also performs the path switching processing for the host computers 10, 12 via the management port 50.

Figure 4:
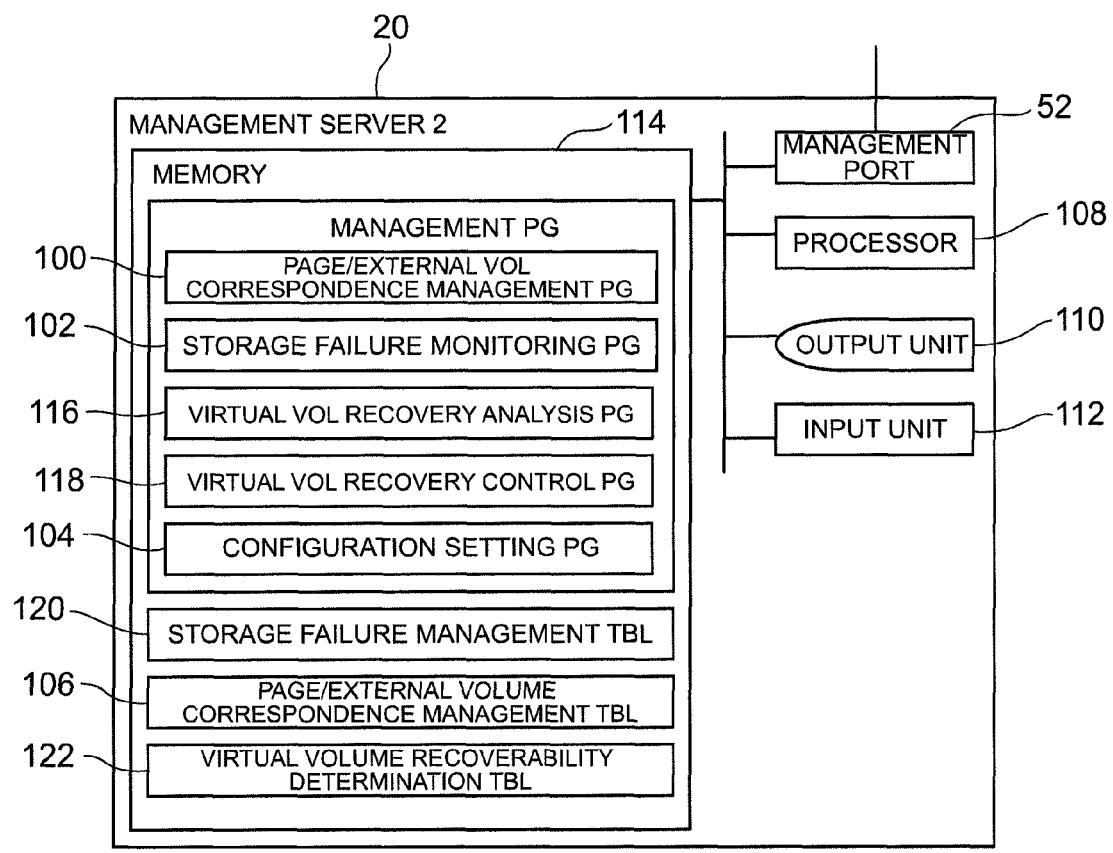
FIG. 4 is a block configuration diagram of a management server 2.

Next, the configuration of the management server 20 is shown in FIG. 4. In FIG. 4, the management server 20 is configured from, in addition to the management port 52, a processor 108, an output unit 110 including a display device, an input unit 112 including input devices such as a mouse, and a memory 114. In the memory 114, as management programs, a page/external volume correspondence management program 100, a storage failure monitoring program 102, a configuration setting program 104, a virtual volume recovery analysis program 116, and a virtual volume recovery control program 118 are stored while, as tables, a page/external volume correspondence management table 106, a storage failure management table 120, and a virtual volume recoverability determination table 122 are stored.

Note that the page/external volume correspondence management table 106 may also be allocated in the storage apparatuses 14, 16.

The processor 108, in addition to performing the integrated control of the entire management server 20, performs various types of processing in accordance with the programs stored in the memory 114, performs the processing such as the configuration setting for the storage apparatus 16 via the management port 52, and also controls path switching for the host computers 10, 12 via the management port 52.

Figure 5:
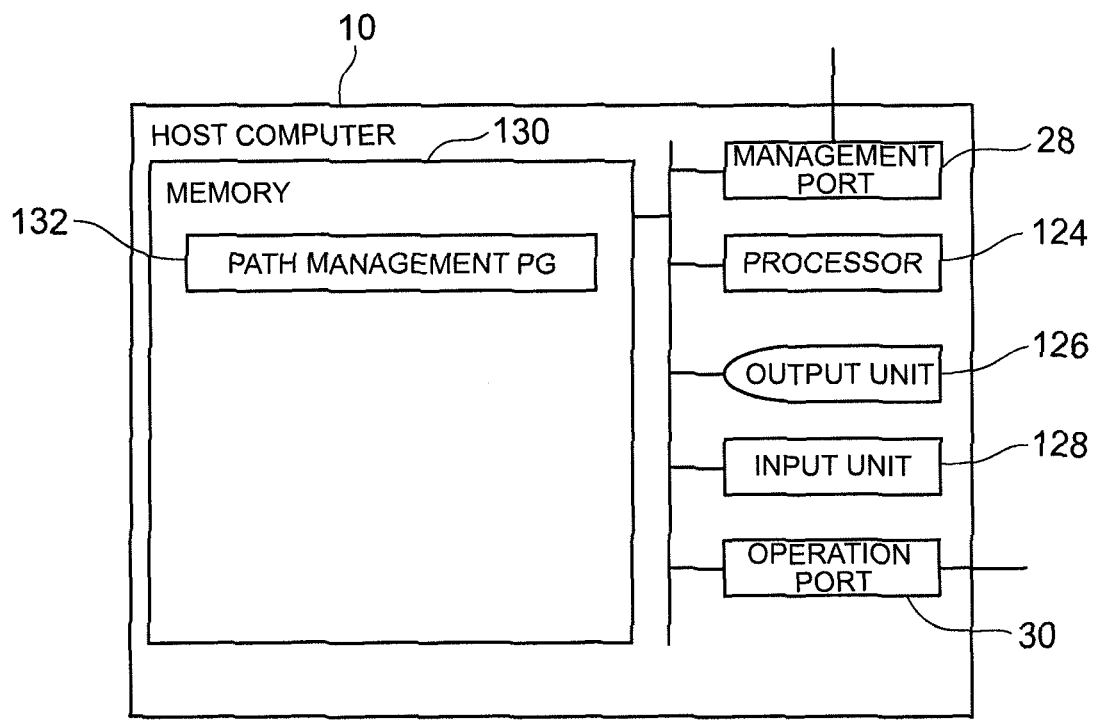
FIG. 5 is a block configuration diagram of a host computer.

Next, the configuration of the host computer 10 is shown in FIG. 5. Note that, as the host computer 12 has the same configuration as [the configuration of] the host computer 10, only the configuration of the host computer 10 is described. The host computer 10 is configured from, in addition to the management port 28 and the operation port 30, a processor 124, an output unit 126 configured of a display device, an input unit 128 configured of input devices such as a mouse, and a memory 130. In the memory 130, a path management program 132 for managing the connection destination of the logical volumes to be provided to the host computer 10 is stored.

The processor 124, in addition to performing the integrated control of the entire host computer 10, creates access requests to the storage apparatus 14, sends the generated access requests to the storage apparatus 14 via the operation port 30 and, when the management port 28 receives an instruction for switching the path from the management server 18 or the management server 20, switches the path connecting the host computer 10 and the storage apparatus 14 in accordance with the path management program 132.

Next, the overview of the processing by the computer system in this embodiment is described with reference to FIG. 6 to FIG. 9.

Figure 6:
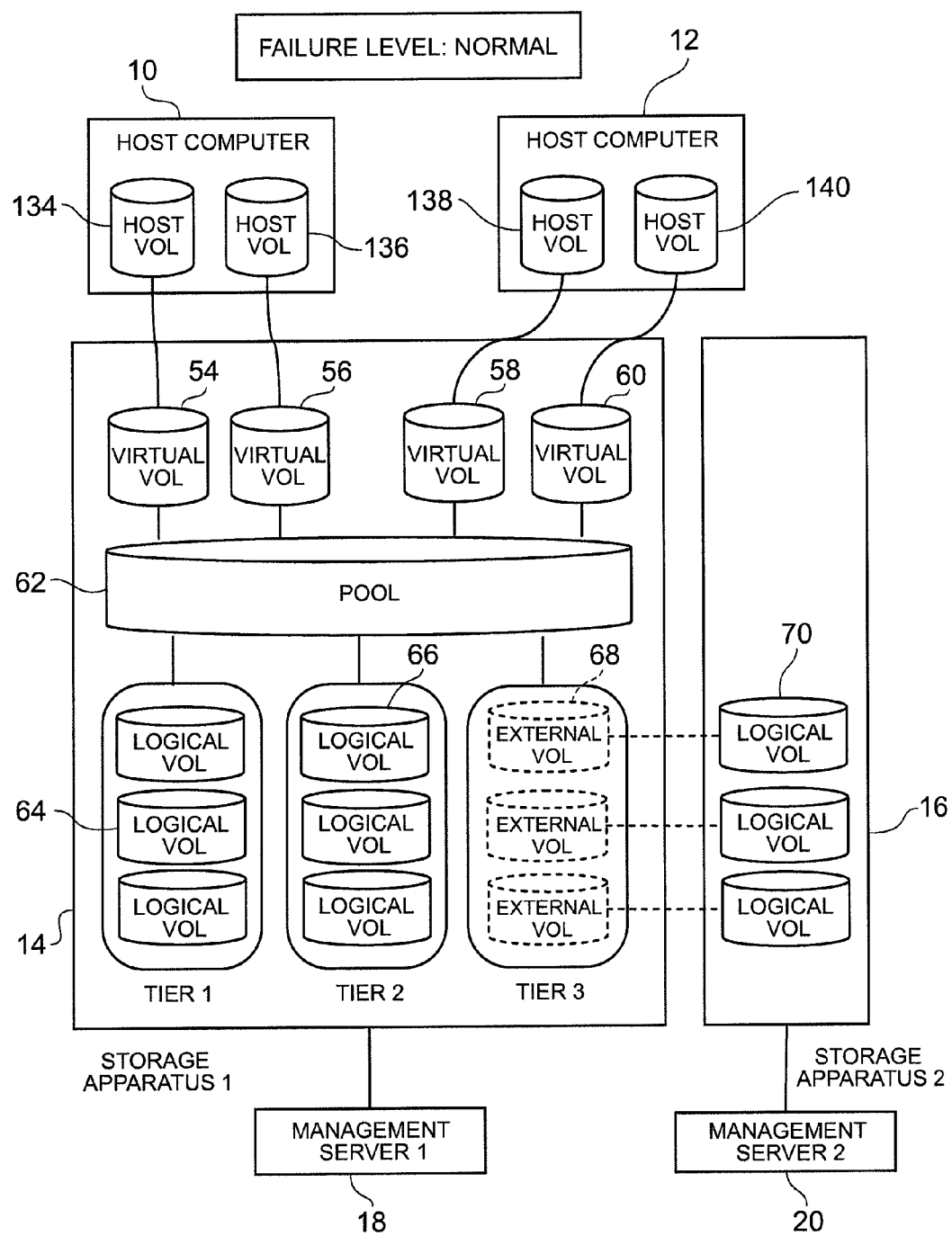
FIG. 6 is a conceptual diagram explaining the normal status of the computer system.

FIG. 6 shows the normal status of the computer system. Firstly, if the entire system including the storage apparatuses 14, 16 and the management servers 18, 20 is normal, the management servers 18, 20 send/receive information to/from each other as well as sending/receiving information to/from the respective storage apparatuses 14, 16, if none of the same is unusual, determine the failure level to be normal, and perform the processing for controlling the respective storage apparatuses 14, 16.

Meanwhile, the host computer 10 manages the virtual volume 54 provided from the storage apparatus 14 by making the same correspond to a host volume 134, and manages the virtual volume 56 by making the same correspond to a host volume 136. The host computer 12 manages the virtual volume 58 provided from the storage apparatus 14 by making the same correspond to a host volume 138, and manages the virtual volume 60 by making the same correspond to a host volume 140.

In this case, the host computer 10, for storing data in the host volume 134 or [the host volume] 136, sends an access request whose access target is the virtual volume 54 or the virtual volume 56 to the storage apparatus 14. The controller 72 of the storage apparatus 14, in response to the access request from the host computer 10, for example, if the access request is a write access, starts up the capacity virtualization control program 84, to the pages corresponding to the virtual volume 54 or the virtual volume 56 among the multiple pages registered in the pool 62 from any of the logical volumes (internal logical volumes) 64, 66 or the external volume (external logical volume) 68, assigns the storage area of the same as the pool volume (internal pool volume or external pool volume), and stores the data in the pages to which any of the pool volumes is assigned.

Similarly, the host computer 12, for storing data in the host volume 138 or the host volume 140, sends an access request whose access target is the virtual volume 58 or the virtual volume 60 to the storage apparatus 14. The controller 72 of the storage apparatus 14, in response to the access request from the host computer 12, for example, if the access request is a write access, starts up the capacity virtualization control program 84, to the pages corresponding to the virtual volume 58 or the virtual volume 60 among the multiple pages registered in the pool 62 from any of the logical volumes 64, 66 or the external volumes 68, assigns the storage area of the same as the pool volume (internal pool volume or external pool volume), and stores the data in the pages to which any of the pool volumes is assigned.

At this step, the management servers 18, 20 send/receive information to/from the respective storage apparatuses 14, 16 and, as the configuration information related to the correspondence relationship between the external volumes 68 and the respective virtual volumes 54 to 60, stores the latest configuration information sequentially. Note that, if the management server is configured of one unit, either of the management servers 18, 20 will configure the latest configuration information sequentially. Meanwhile, if the configuration that the respective storage apparatuses 14, 16 include a part of the functions of the respective management servers 18, is adopted, as the configuration information related to the correspondence relationship between the external volumes 68 and the respective virtual volumes 54 to 60, the latest configuration information may also be stored in the respective storage apparatuses 14, 16 sequentially.

Figure 7:
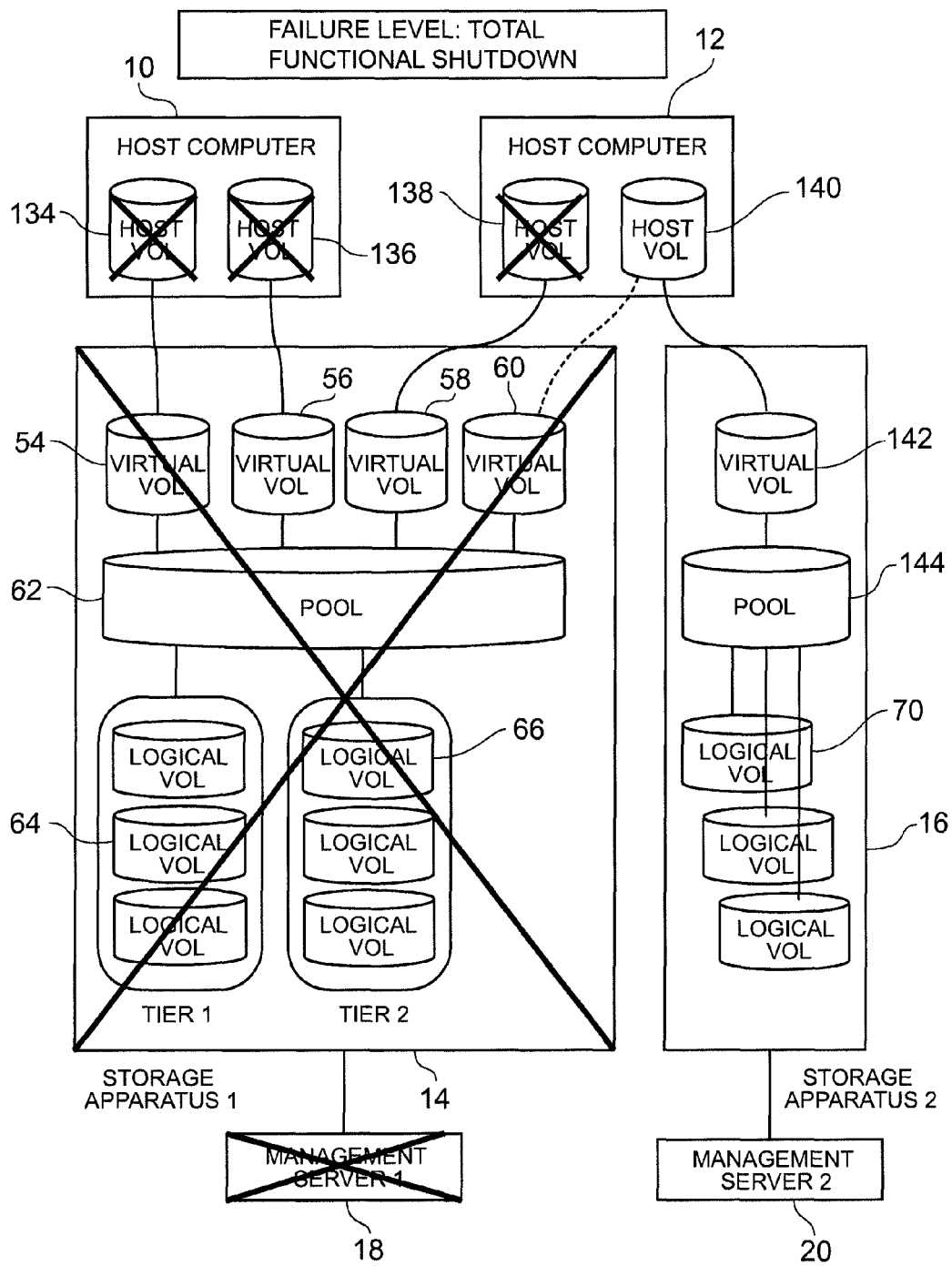
FIG. 7 is a conceptual diagram explaining the processing of the computer system in the case of a total functional shutdown.

Next, the status in the case of a total functional shutdown of the computer system is shown in FIG. 7. The management server 20, in the course of sending/receiving information to/from the host computers 10, 12, the storage apparatuses 14, 16, and the management server 18, for example, if detecting a total functional shutdown of the system including the storage apparatus 14, the management server 18, and the host computer 10 due to a damage to a site or a power failure, determines that an unusual status occurred in the system including the host computer 10, the storage apparatus 14 and the management server 18, in addition to determining the failure level to be total functional shutdown, performs the processing for recovering the data of the virtual volume 60 to which the external volumes 68 which are made to correspond to the logical volume 70 were assigned.

For example, the management server 20, if no virtual volume or pool exists in the storage apparatus 16, creates a virtual volume 142 in the same configuration as the virtual volume 60 in the storage apparatus 16 which is in the normal status, further creates a pool 144, in accordance with the configuration information stored before the occurrence of the unusual status, associates the respective pages set for the pool 144 with the respective blocks of the virtual volume 142 and, to the respective pages set for the pool 144, assigns the volumes divided from the logical volumes 70 and the external volumes 68 as pool volumes.

Subsequently, the management server 20 provides the virtual volume 142 as a new access target to the host computer 12, and also instructs the host computer 12 to switch the path. The host computer 12, in accordance with the path management program 132, switches the path connecting the host volume 140 and the virtual volume 60 to a path 2 connecting the host volume 140 and the virtual volume 142, associates the virtual volume 142 provided from the storage apparatus 16 with the host volume 140, and manages the virtual volume 142 as the new access target. That is, the host computer 12, by making the virtual volume 142 the access target and outputting an access request to the storage apparatus 16, can access the data of the logical volume 70; that is, the data of the pages including the external volumes 68 in the pool volume.

As described above, even if the failure level is total functional shutdown, for example, by storing the configuration information indicating the correspondence relationship between the external volumes 68 and the virtual volume 60 in the management server 20, the management server 20 can recover the data of the pages including the external volumes 68 in the pool volume; that is, the data of the virtual volume 60 to which the external volumes 68 were assigned.

Figure 8:
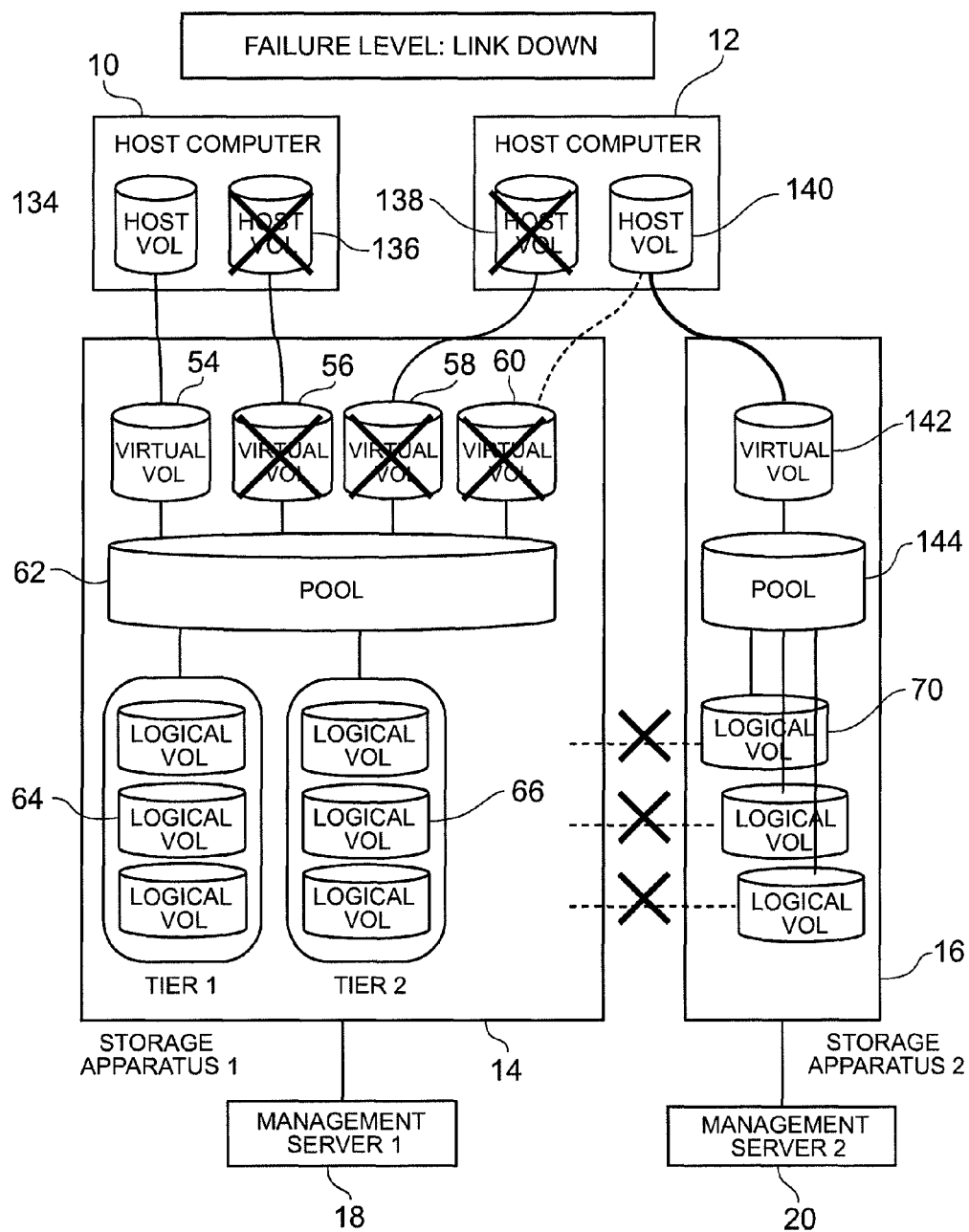
FIG. 8 is a conceptual diagram explaining the processing of the computer system in the cases where a link down occurs.

Next, the status in the case of a link down of the computer system is shown in FIG. 8. The management server 20, in the course of sending/receiving information to/from the host computers 10, 12, the storage apparatuses 14, 16, and the management server 18, for example, if the inter-storage network 24 is blocked, determines that an unusual status occurred in the inter-storage network 24 as well as determining the failure level to be link down and, if, any of the virtual volumes 54 to 60 is made to correspond to the pages including the external volumes 68 as the volume assigned as pool volumes, performs the processing determining the virtual volume to be impossible to use.

For example, if only the logical volumes 64, 66 are assigned to the page corresponding to the virtual volume 54 as pool volumes (internal pool volumes), [the management server] determines the virtual volume 54 to be normal and, if external volumes 68 are assigned as pool volumes (external pool volumes) to the pages corresponding to the virtual volumes 56, 58 in addition to the pool volumes (internal pool volumes) configured of logical volumes 64, 66, determines the virtual volumes 56, 58 to be impossible to use. Furthermore, if external volumes 68 are assigned as pool volumes (external pool volumes) to the pages corresponding to the virtual volume 60, [the management server] determines the virtual volume 60 to be impossible to use.

However, if only the external volumes 68 are assigned to the pages corresponding to the virtual volume 60 as pool volumes (external pool volumes), on condition that the configuration information indicating the correspondence relationship between the virtual volume 60 and the external volumes 68 is stored before any unusual status occurs, [the management server] considers the data of the virtual volume 60 to which the external volumes 68 were assigned to be possible to recover.

At this step, the management server 20, as well as creating a virtual volume 142 of the same configuration as the virtual volume 60 in the storage apparatus 16, creates a pool 144, establishes the correspondence between the virtual volume 142 and the pool 144 in accordance with the configuration information stored before the unusual status occurred, and assigns the logical volumes 70 to each of the pages set for the pool 144. Then, the management server 20 provides the virtual volume 142 to the host computer 12 as a new access target of the host computer 12, and instructs the host computer 12 to switch the path.

The host computer 12, in accordance with the path management program 132, switches the path connecting the host volume 140 and the virtual volume 60 to a path 2 connecting the host volume 140 and the virtual volume 142, associates the virtual volume 142 provided from the storage apparatus 16 with the host volume 140, and manages the virtual volume 142 as a new access target. That is, the host computer 12, by outputting an access request whose access target is the virtual volume 142 to the storage apparatus 16, can access the data of the logical volumes 70; that is, the data of the pages including the external volumes 68 in the pool volumes, which is the data of the virtual volume 60 to which the external volumes 68 were assigned.

As described above, even if a link down occurs along with the unusual status of the inter-storage network 24, for example, by storing the configuration information indicating the correspondence relationship between the external volumes 68 and the virtual volume 60 in the management server 20, the management server 20 can recover the data of the pages including the external volumes 68 in the pool volumes; that is, the data of the virtual volume 60 to which the external volumes 68 were assigned.

Figure 9:
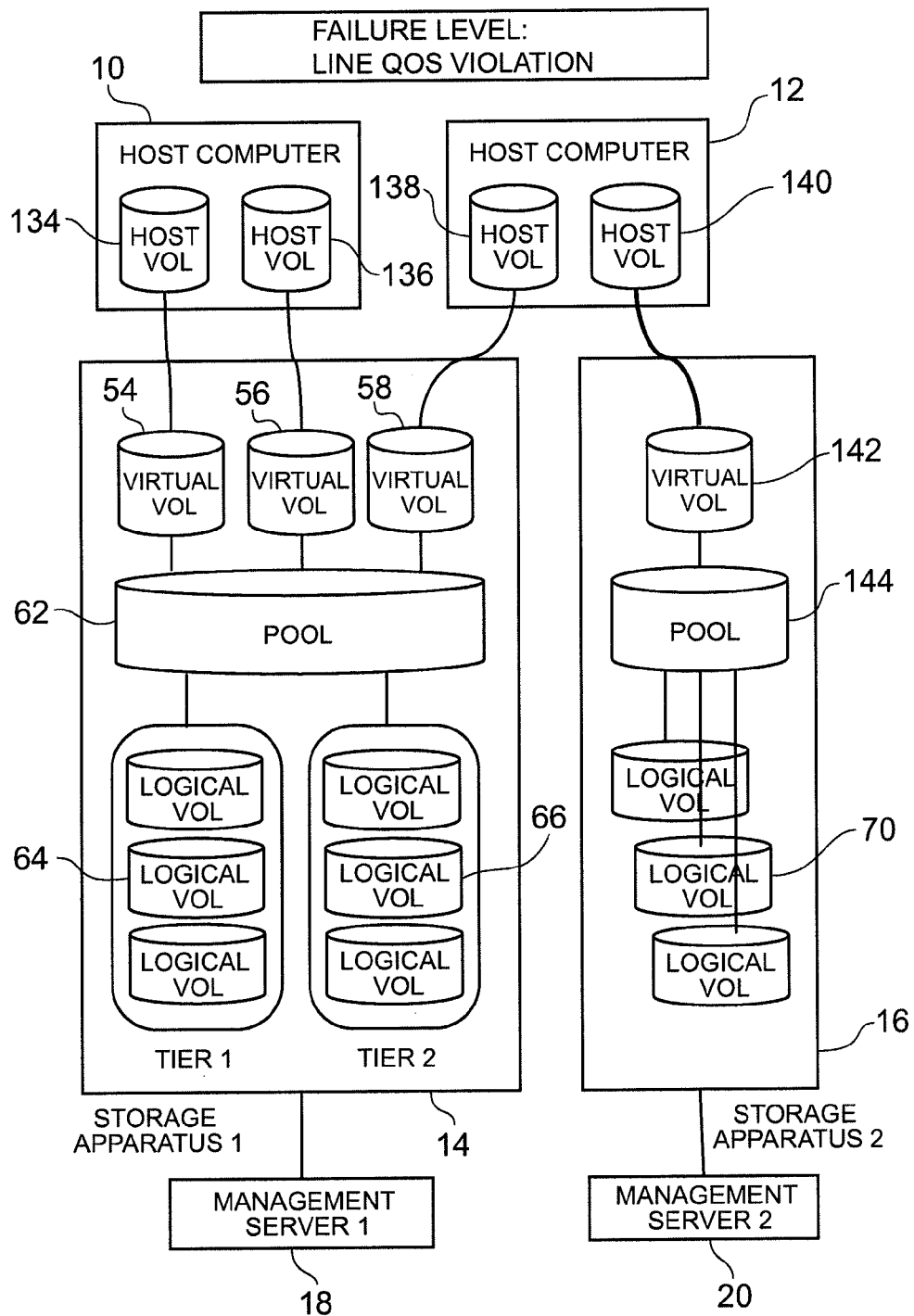
FIG. 9 is a conceptual diagram explaining the processing of the computer system in the case of a line QoS violation.

Next, the status in the cases where a line QoS (Quality of Service) violation occurs in the computer system is shown in FIG. 9.

In the course where the host computers 10, 12, the storage apparatuses 14, 16, and the management servers 18, 20 send/receive information to/from each other, the failure level of line QoS violation may occur.

For example, if the port for external connection 40 of the storage apparatus 14 and the port for external connection 46 of the storage apparatus 16 are respectively connected to the operation network 22 and QoS is set as the line speed between the storage apparatuses 14, 16, the externally connected communication (communication between the storage apparatuses 14, 16) may strain the QoS and cause a line QoS violation.

In this case, the management server 20, if detecting that the communication between the storage apparatuses 14, 16 causes a line QoS violation, determines this failure level to be a failure level different from total functional shutdown or link down and, even if the virtual volumes 54 to 60 can be used, performs the processing for migrating the data of the pages to which the external volumes 68 are assigned as pool volumes (external pool volumes) to the storage apparatus 16.

Firstly, the management server 20 determines whether external volumes 68 and internal volumes (logical volumes 64, 66) exist or not among the volumes assigned as the pool volumes to the respective pages of the pool 62 in the storage apparatus 14; that is, whether page reallocation is necessary or not, if, among the pages of the pool 62, as pool volumes, pool volumes (internal pool volumes) configured of internal volumes (logical volumes 64, 66) and pool volumes (external pool volumes) configured of external volumes 68 exist, determines that page reallocation is necessary, on condition that no virtual volume exists in the storage apparatus 16, creates a virtual volume 142 of the same configuration as the virtual volume 60 in the storage apparatus 16, and also creates a pool 144.

The management volume 20, in accordance with the stored configuration information (the configuration information indicating the correspondence relationship between the external volumes 68 and the virtual volume 60) or the configuration information (the configuration information indicating the correspondence relationship between the external volumes 68 and the virtual volume 60), associates the respective pages reallocated to the pool 144 with the respective blocks in the virtual volume 142, and also assigns the volumes divided from the logical volumes 70 and the external volumes 68 to the respective pages reallocated to the pool 144 as pool volumes.

Subsequently, the management server 20 provides the virtual volume 142 as a new access target to the host computer 12, and also instructs the host computer 12 to switch the path. The host computer 12, in accordance with the path management program 132, switches the path connecting the host volume 140 and the virtual volume 60 to a path 2 connecting the host volume 140 and the virtual volume 142, associates the virtual volume 142 provided from the storage apparatus 16 with the host volume 140, and manages the virtual volume 142 as the new access target.

That is, the host computer 12, by making the virtual volume 142 the access target and outputting an access request to the storage apparatus 16, can access the data of the logical volume 70; that is, the data of the pages including the external volumes 68 in the pool volumes, which is the data of the virtual volume 60 to which the external volumes 68 were assigned.

By this method, as the host computer 12 accesses the storage apparatus 16 instead of accessing the storage apparatus 14, if the externally connected communication (communication between the storage apparatuses 14, 16) is decreased, the management server 20 can cancel the QoS violation.

At this step, the management server 20 can secure the QoS for the storage apparatus 16 by reallocating the pages in the pool 144 so as to localize the correspondence between the pages of the pool 144 and the virtual volume 142 inside the storage apparatus 16.

Note that, if the failure level is total functional shutdown, link down, or line QoS violation and if no page is set for the pool 62, without setting any pages for the pool 144, in accordance with the stored configuration, it is also possible to assign the logical volumes 70 made to correspond to the external volumes 68 to the pool 144 and to associate the logical volumes 70 assigned to the pool 144 with the respective blocks of the virtual volume 142.

Next, the configuration of a storage failure management table in the case of a total functional shutdown is shown in FIG. 10.

The storage failure management table 120 is configured of a storage apparatus field 150, an external connection function field 152, a failure level field 154, an effective line speed field 156, a guaranteed line speed field 158, an externally connected communication volume field 160, and a management server field 162.

In an entry of the storage apparatus field 150, as the name of a storage apparatus for uniquely identifying the storage apparatus in the computer system, for example, in the case of the storage apparatus 14, "storage apparatus 1" is stored while, in the case of the storage apparatus 16, "storage apparatus 2" is stored.

In an entry of the external connection function field 152, as the information whether the storage apparatus comprises the external connection function or not, "enabled" or "disabled" is stored. For example, in the case of the storage apparatus 14, since the storage apparatus 16 is connected as the storage apparatus comprising the external connection function, in the entry corresponding to the storage apparatus 14, "enabled" is stored. Meanwhile, in the case of the storage apparatus 16, which does not comprise the external connection function, in the entry corresponding to the storage apparatus 16, "disabled" is stored.

In an entry of the failure level field 154, the information indicating the failure level of the storage apparatus is stored. For example, if the storage apparatus 14 is in an unusual status and causes a total functional shutdown, in the entry corresponding to the storage apparatus 14, "total functional shutdown" is stored while, if the storage apparatus 16 is in the normal status, "normal" is stored in the entry corresponding to the storage apparatus 16.

In an entry of the effective line speed field 156, the information indicating the effective line speed of the storage apparatus is stored. For example, in the entry corresponding to the storage apparatus 14, as the effective line speed of the storage apparatus 14, "300 Mbps" is stored while, in the entry corresponding to the storage apparatus 16, as the effective line speed of the storage apparatus 16, "500 Mbps" is stored.

In an entry of the guaranteed line speed field 158, the information indicating the guaranteed line speed of the storage apparatus is stored. For example, in the entry corresponding to the storage apparatus 14, as the guaranteed line speed of the storage apparatus 14, "100 Mbps" is stored while, in the entry corresponding to the storage apparatus 16, as the guaranteed line speed of the storage apparatus 16, "100 Mbps" is stored.

In an entry of the externally connected communication volume field 160, the information indicating the communication volume between the storage apparatus comprising the external connection function and the externally connected storage apparatus is stored. For example, in the entry corresponding to the storage apparatus 14, as the externally connected communication volume of the storage apparatus 14, "20 Mbps" is stored. Note that, as no other storage apparatus is externally connected to the storage apparatus 16, no information of the externally connected communication volume is stored in the entry corresponding to the storage apparatus 16.

In an entry of the management server field 162, as the information for uniquely identifying a management server managing the storage apparatus, the name of the management server is stored. For example, in the entry corresponding to the storage apparatus 14, as the management server 18 managing the storage apparatus 14, "management server 1" is stored while, in the entry corresponding to the storage apparatus 16, as the management server 20 managing the storage apparatus 16, "management server 2" is stored.

Next, the configuration of the storage failure management table in the case of a link down is shown in FIG. 11.

The storage failure management table 120 in the case of a link down is the table where, if the management server 20 detects a link down of the storage apparatus, among the entries of the failure level field 154, in the entry corresponding to the storage apparatus where the link down occurred, the information of the "link down" is stored, and is configured of the same fields as in the storage failure management table 120 shown in FIG. 10.

For example, if the management server 20 detects a link down of the storage apparatus 14, in the entry corresponding to the storage apparatus 14 among the entries in the failure level field 154, the "link down" is stored. In the respective entries of the other fields, the same information as the information of the storage failure management table 120 shown in FIG. 10 is stored.

Next, the configuration of the storage failure management table in the case of a line QoS violation is shown in FIG. 12.

The storage failure management table 120 in the case of a line QoS violation is the table where, if the management server 20 detects a line QoS violation, among the entries of the failure level field 154, in the entry corresponding to the storage apparatus where the line QoS violation occurred, the information of the "line QoS violation" is stored, and is configured of the same fields as in the storage failure management table 120 shown in FIG. 10.

For example, if the management server 20 detects a line QoS violation of the storage apparatus 14, in the entry corresponding to the storage apparatus 14 among the entries in the failure level field 154 in the storage failure management table 120, the "line QoS violation" is stored.

In this case, the storage failure management table 120 shown in FIG. 12 indicates that "200 Mbps" as the externally connected communication volume is the bottleneck and causes the guaranteed line speed of "100 Mbps" while, along with the decrease of the effective line speed from "300 Mbps" to "50 Mbps," a line QoS violation occurred.

Next, the configuration of a page/external volume correspondence management table 106 managed by the management servers 18, 20 is shown in FIG. 13.

The page/external volume correspondence management table 106 is configured of a storage apparatus field 170, a tier priority field 172, a volume type field 174, a pool volume field 176, an external storage field 178, an external volume field 182, a page field 182, and a virtual volume field 184.

In an entry of the storage apparatus field 170, as the name of a storage apparatus for uniquely identifying the storage apparatus in the computer system, for example, in the case of the entry corresponding to the storage apparatus 14, "storage apparatus 1" is stored.

In an entry of the tier field 172, the information indicating the hierarchy of the storage devices belonging to the storage apparatus is stored with the information indicating the priority. For example, if the hierarchies of logical volumes configured of the storage devices belonging to the storage apparatus 14 are classified into three tiers, in the entry corresponding to the storage apparatus 14, a tier (2), a tier (1), and a tier (3) are stored. In this case, the numerical numbers in the parentheses indicate the priority of the pool volumes to be assigned to the respective pages set for the pool 62, which is the priority of the tiers.

In an entry of the volume type field 174, the information related to an identifier for classifying the logical volumes corresponding to each tier is stored. For example, if the tier (2) is configured of the external volumes 68 and the logical volumes 70 corresponding to the external volumes 68 are configured of SUS's, in this entry, "external connection (SUS)" is stored. If the tier (1) is configured of the logical volume 64 or the logical volume 66 configured of SUS's, in this entry, "SUS" is stored. Furthermore, if the tier (3) is configured of the external volumes 68 and the logical volumes 70 corresponding to the external volumes 68 are configured of SATAs, in this entry, "external connection (SATA)" is stored.

In an entry of the pool volume field 176, the identifier for uniquely identifying the pool volumes belonging to each tier is stored. For example, in the entry corresponding to the tier (2), if the volumes belonging to the tier (2) are assigned as two pool volumes to the pages, as identifiers for identifying the respective pool volumes, "VOL 1" and "VOL 2" are stored. In the entry corresponding to the tier (1), if the volumes belonging to the tier (1) are assigned as two pool volumes to the pages, as identifiers for identifying the respective pool volumes, "VOL 3" and "VOL 4" are stored. In the entry corresponding to the tier (3), if the volume belonging to the tier (3) is assigned as one pool volume to the page, as identifiers for identifying this pool volume, "VOL 5" is stored.

In an entry of the external storage field 178, an identifier for uniquely identifying an external storage which is externally connected to the storage apparatus 14 is stored. For example, if the pool volumes VOL 1, VOL 2 are configured in the storage apparatus 16, in these entries for these, "storage 2" is stored. Note that, in the entry corresponding to the tier (1), since the internal logical volumes 64, 66 are used as the pool volumes belonging to the tier (1), the information of "(internal)" is stored.

In an entry of the external volume field 180, an identifier for uniquely identifying an external storage which is stored in the entry of the external storage field 178 is stored. For example, if the pool volumes VOL 1, VOL 2 are configured of external volumes, for identifying the pool volumes VOL 1, VOL 2 as external volumes, "EXVOL 1," "EXVOL 2" are stored in the entries corresponding to the "storage 2." In the entry corresponding to the storage 3, "EXVOL 3" is stored. Note that, in the entry corresponding to the tier (1), since no external storage exists, [the information of] "(internal)" is stored.

In an entry of the page field 182, an identifier for uniquely identifying a page to which the pool volume stored in the pool volume field 176 is assigned is stored. For example, if the pool volume VOL 1 is assigned to the pages 1 to 3 and the pool volume VOL 2 is assigned to the pages 4 and 5, among the entries of the pool volume field 176, in the entries corresponding to the "VOL 1," "page 1", "page 2", "page 3" are stored while, in the entries corresponding to the "VOL 2," "page 4," "page 5" are stored.

Similarly, the pool volumes VOL 3, 4, 5 are assigned to the pages 6 to 7, the page 8, the page 9 respectively, wherein the "page 6," "page 7" are stored in the entry corresponding to the "VOL 3," the "page 8" is stored in the entry corresponding to the "VOL 4," and the "page 9" is stored in the entry corresponding to the "VOL 5."

In an entry of the virtual volume field 184, an identifier for uniquely identifying a virtual volume corresponding to the page stored in the page field 182 is stored. For example, if the page 1, the page 2 are made to correspond to the virtual volume 54 and the page 3 is made to correspond to the virtual volume 56, in the entries corresponding to the page 1, the page 2, as an identifier for identifying the virtual volume 54, "VVOL 1" is stored while, in the entry corresponding to the page 3, as an identifier for identifying the virtual volume 56, "VVOL 2" is stored.

Furthermore, if the page 4 is made to correspond to the virtual volume 54 and the page 5 is made to correspond to the virtual volume 60, in the entry corresponding to the page 4, as an identifier for identifying the virtual volume 54, "VVOL 1" is stored while, in the entry corresponding to the page 5, as an identifier for identifying the virtual volume 60, "VVOL 4" is stored. Similarly, if the page 6, the page 7 are made to correspond to the virtual volume 56 and the page 8 is made to correspond to the virtual volume 58, in the entries corresponding to the page 6, the page 7, as an identifier for identifying the virtual volume 56, "VVOL 2" is stored while, in the entry corresponding to the page 8, as an identifier for identifying the virtual volume 58, "VVOL 3" is stored.

Next, the configuration of the page allocation management table 90 managed by the storage apparatus 14 is shown in FIG. 14.

The page allocation management table 90 is configured of a storage apparatus field 190, a tier field 192, a volume type field 194, a pool volume field 196, a page field 198, and a virtual volume field 200.

The page allocation management table 90 is of the same configuration as the page/external volume correspondence management table 106 shown in FIG. 13 except that the external storage field 178 and the external volume field 180 do not exist.

That is, the information stored in the page allocation management table 90 is sequentially updated by the controller 72 each time a page is allocated in the pool 62 of the storage apparatus 14, and the updated information is sequentially sent to the management servers 18, 20 by the controller 72. Therefore, in the entries of the respective fields 190 to 200 of the page allocation management table 90, the information stored in the entries of the fields 170, 172, 174, 176, 182, and 184 of the page/external volume correspondence management table 106 shown in FIG. 13 is stored.

Next, the configuration of the virtual volume recoverability determination table 122 in the case of a total functional shutdown is shown in FIG. 15.

The virtual volume recoverability determination table 122 is configured of a storage apparatus field 210, a virtual volume field 212, an operation host field 214, a pool volume field 216, a status field 218, and a recoverability field 220.

In an entry of the storage apparatus field 210, as the information for uniquely identifying a storage apparatus in the computer system, the name of the storage apparatus is stored. For example, in the case of the storage apparatus 14, "storage apparatus 1" is stored in the entry corresponding to the storage apparatus 14.

In an entry of the virtual volume field 212, an identifier for uniquely identifying a virtual volume belonging to the storage apparatus is stored. For example, if the storage apparatus 14 comprises the virtual volumes 54 to 60, in the entries corresponding to the storage apparatus 14, as the identifiers for identifying the virtual volumes 54 to 60, "VVOL 1" to "VVOL 4" are stored.

In an entry of the operation host field 214, an identifier for uniquely identifying an operation host to which the virtual volume is provided is stored. For example, if the virtual volume 54 is provided to the host computer 10, as an identifier for identifying the host computer 10, "VVOL 1" is stored while, if the virtual volume 56 is provided to the host computer 12, as an identifier for identifying the host computer 12, "VVOL 2" is stored.

In an entry of the pool volume field 216, an identifier for uniquely identifying a pool volume to be assigned to the virtual volume is stored. For example, if the pool volume assigned to the virtual volume VVOL 1 is configured of the external volumes 68, in the entries of the virtual volume VVOL 1, "VOL 1 (external)," "VOL 2 (external)" are stored. Furthermore, if the pool volume assigned to the virtual volume VVOL 2 is configured of the logical volumes 66 and the external volumes 68, in the entries corresponding to the virtual volume VVOL 2, "VOL 1 (external)," "VOL 3 (internal)" are stored.

Furthermore, if the pool volume assigned to the virtual volume VVOL 3 is configured of the logical volumes 64, in the entries corresponding to virtual volume VVOL 3, "VOL 4 (internal)" is stored. Furthermore, if the pool volume assigned to the virtual volume VVOL 4 is configured of the external volumes 68 and the external volumes configured of the storage devices belonging to the third storage apparatus (not shown in the figure), in the entries corresponding to the virtual volume VVOL 4, "VOL 2 (external)," "VOL 5 (external)" are stored.

In an entry of the status field 218, as the information indicating the status of a pool volume, "normal" or "failure" is stored. For example, if, due to a total functional shutdown, the logical volumes 64, 66 cannot be used while the external volumes 68 are normal, in the entries including the external volumes 68 as pool volumes, "normal" is stored while, in the entries including the internal volumes (the volumes configured of the logical volumes 64, 66) as pool volumes, "failure" is stored. Note that, in the case of the pool volume VOL5 (external), as the third storage apparatus is in the failure status, even if the pool volume is assumed to be external, the information of "failure" is stored.

In an entry of the recoverability field 220, as the information indicating whether the data belonging to a pool volume can be recovered or not, the information of "possible" or "impossible" is stored.

For example, as the virtual volume VVOL 1, if the pool volumes are VOL 1 (external) and VOL 2 (external) and are configured of the external volumes 68 only, the statuses of these pool volumes are both "normal," and therefore the information of "possible" is stored in this entry.

Meanwhile, as the virtual volume VVOL 2, if the pool volumes are VOL 1 (external) and VOL 3 (internal) and are configured of the internal logical volumes 66 and the external volumes 68, even if one [pool volume] is normal, the other is [in the] failure [status], and therefore the information of "impossible" is stored in this entry.

Furthermore, as the virtual volume VVOL 3, if the pool volumes are VOL 4 (internal) and are configured of the internal logical volumes 64, as the configuration information related to the internal volumes is not stored and the status is "failure," the information of "impossible" is stored in this entry. Note that, as for the virtual volume VVOL 4, though the pool volumes are configured of an internal volume and an external volume, even if one pool volume is normal, the other pool volume is [in the] failure [status], and therefore the information of "impossible" is stored in this entry.

Next, the configuration of the virtual volume recoverability determination table 122 in the case of a link down is shown in FIG. 16.

The virtual volume recoverability determination table 122 in the case of a link down is a table for, if the management server 20 detects a link down of a storage apparatus, among the entries of the status field 218, in the entry corresponding to the storage apparatus where the link down occurred, storing the information of "link down" as well as storing the information of "possible" or "impossible" in the entry of the recoverability field 220, and is configured of the same fields as in the virtual volume recoverability determination table 122 shown in FIG. 15.

For example, if the management server 20 detects a link down of the storage apparatus 14, among the entries of the status field 218, in the entry corresponding to the storage apparatus 14, "link down" is stored while, in the entry of the recoverability field 220, the information of "possible" or "impossible" is stored and, in the respective entries of the other fields, the same types of information as in the virtual volume recoverability determination table 122 shown in FIG. 15 are stored.

At this step, if a link down occurs due to the unusual status of the inter-storage network 24, among the entries of the status field 218, in the entry where the pool volumes are configured of external volumes 68, the information of "link down" is stored while, in the entries where the pool volumes are configured of the logical volumes 64, 66, the information of "normal" is stored. Note that, as for the pool volume VOL 5, if the third storage apparatus is normal, the information of "normal" is stored in this entry.

Furthermore, even if "link down" is stored in the status indicating the pool volume status, if the pool volumes are configured of external volumes 68 only, by storing the configuration information related to the correspondence relationship between the external volumes 68 and the virtual volume, the data of the pages corresponding to the relevant virtual volume can be recovered, and therefore the information of "possible" is stored in the entry of the recoverability field 220 in the virtual volume recoverability determination table 122.

Meanwhile, even if "normal" is stored in the status indicating the pool volume status, if the pool volumes are configured of external volumes 70 and logical volumes 64, 66, the virtual volume corresponding to the pool volumes in whose status "link down" is stored cannot be accessed, and therefore the information of "impossible" is stored in these entries. Meanwhile, if the pool volume is configured of logical volumes 64, 66 only, the virtual volume corresponding to this pool volume can be accessed, and therefore the information of "possible" is stored in this entry. Furthermore, as for the virtual volume VVOL4, as one of the pool volumes is normal and the other is [in the] link down [status], which makes the connection impossible, the information of "impossible" is stored in this entry.

Next, the configuration of the virtual volume recoverability determination table 122 in the case of a line QoS violation is shown in FIG. 17.

The virtual volume recoverability determination table 22 in the case of a line QoS violation is the table to which, instead of the recoverability field 220, a page reallocation necessity field 222 is added, and the other configuration is configured of the same fields of the virtual volume recoverability determination table 122 shown in FIG. 15.

For example, if the management server 20 detects a QoS violation of the storage apparatus 14, in the entry corresponding to the storage apparatus 14 among the entries of the status field 218, "QoS violation" is stored, and the information of "unnecessary" or "necessary" is stored in the entry of the page reallocation necessity field 222 while, in the respective entries of the other fields, the same information as in the virtual volume recoverability determination table 122 shown in FIG. 15 is stored.

At this step, for indicating that the QoS is strained due to the communication with the external connection and that a line QoS violation occurred, among the entries of the status field 218, in the entries where the pool volumes are configured of external volumes 68, the information of "QoS violation" is stored while, in the entries where the pool volumes are configured of logical volumes 64, 66, the information of "normal" is stored.

In an entry of the page reallocation necessity field 222, the information indicating whether it is necessary to reallocate pages in the pool or not is stored. For example, if the pool volumes assigned to the pages set for the pool 62 are configured of internal logical volumes 64, 66 and external volumes 68, it is considered to be necessary to reallocate the pages, and the information of "necessary" is stored in this entry.

Meanwhile, if the pool volumes assigned to the pages set for the pool 62 are configured of the external volumes 68 only, it is considered to be unnecessary to reallocate the pages, and the information of "unnecessary" is stored in this entry.

As a line QoS violation is not the type of failure such as a total functional shutdown or a link down, if detecting a line QoS violation, the management server 20 will determine the necessity of page reallocation and store the result of the determination in the respective entries of the page reallocation necessity field 222. At this step, the management server 20, if the pool volumes are configured of the external volumes 68 only, can apply the configuration of the pages allocated for the pool 62 to the pages of the pool 144, and therefore will store the information of "unnecessary" in the entry of the page reallocation necessity field 222.

Meanwhile, if pages wherein pool volumes are configured of external volumes 68 and logical volumes 64, 66 exist, the management server 20, as it is necessary to delete the logical volumes 64, 66 and reassign the pool volumes configured of external volumes 68 only to the pages, will store the information of "necessary" in the entry of the page reallocation necessity field 222. Note that, if the pool volumes are configured of logical volumes 64, 66 only, as it is unnecessary to reallocate these pool volumes to the pages, and the information of "unnecessary" is stored in this entry.

Figure 18:
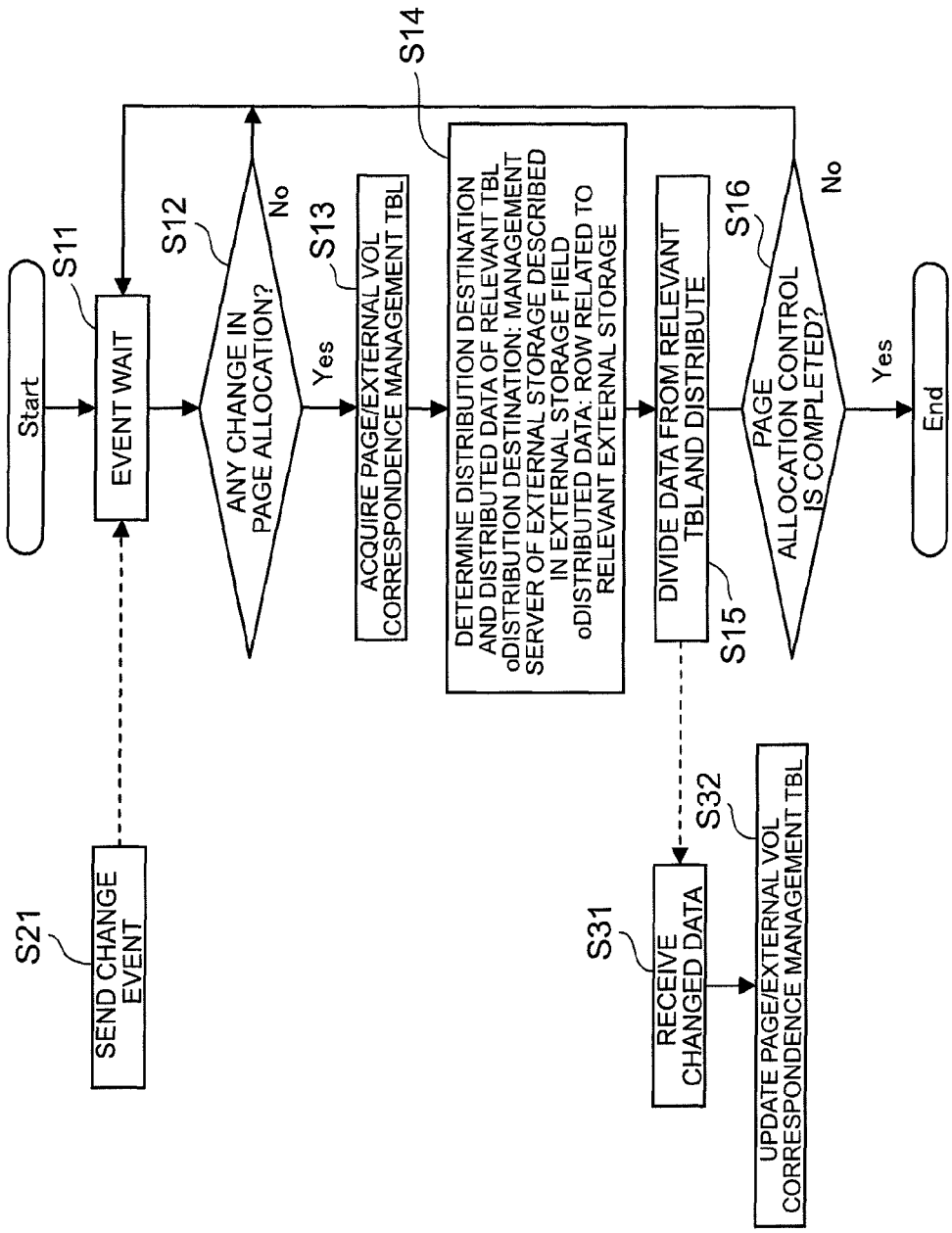
FIG. 18 is a flowchart explaining the processing of a page/external volume correspondence management program.
Figure 19:
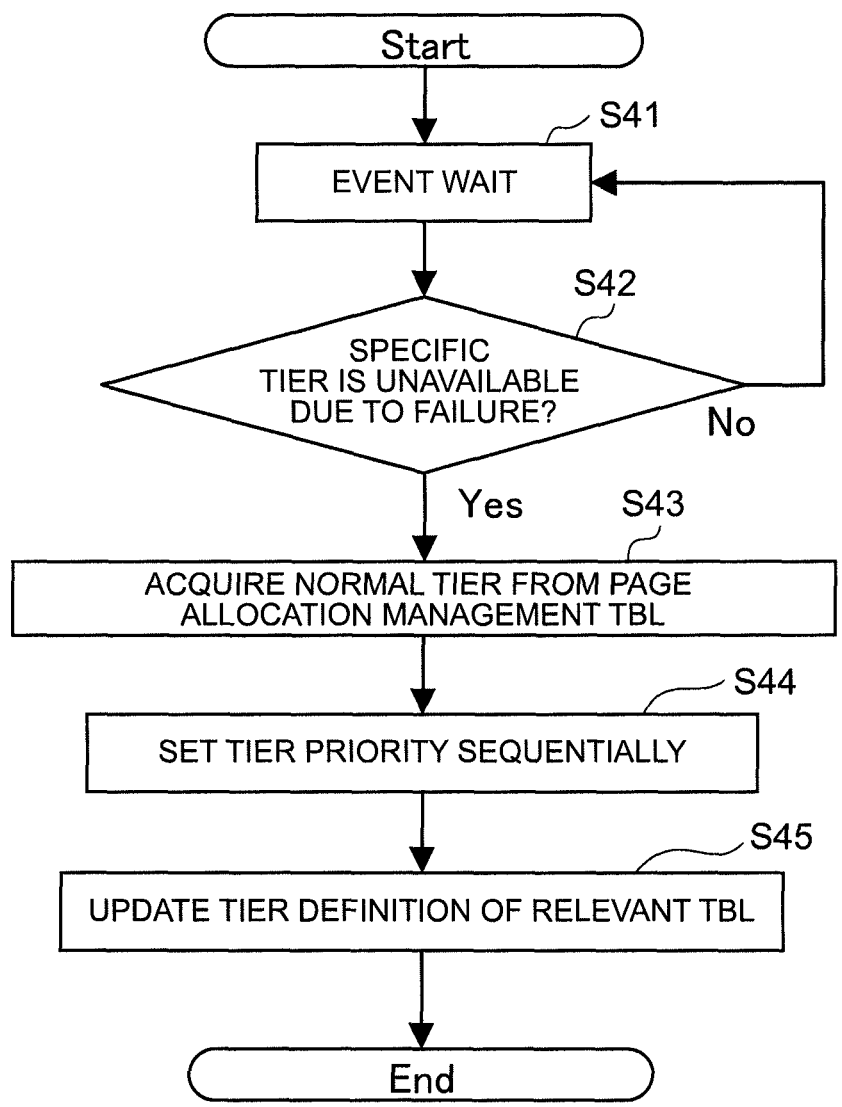
FIG. 19 is a flowchart explaining the processing of a page allocation control program.

Next, the processing of the page/external volume correspondence management program 100 is described with reference to the flowchart of FIG. 18.

Firstly, if the management server 18 is the distribution source of the information and the management server 20 is the distribution destination of the information, the processor 92 of the management server 18 starts up the page/external volume correspondence management program 100 to start the processing, and performs the event wait processing (S11).

When the processor 92 of the management server 18 is in the event wait status, the controller 72 in the storage apparatus 14 starts up the page allocation control program 80, sets pages for the pool 62 in response to the access request from the host computer 10 or the host computer 12, and performs the processing for assigning the logical volumes 64, 66 or external volumes 68 to the pages as pool volumes. At this time, if a change event processing is performed, the controller 72 in the storage apparatus 14 sends information related to the change event to the management server 18. For example, if a page reallocation is performed, the controller 72 in the storage apparatus 14 sends the change event to the management server 18 via the management port 42 (S21).

If the processor 92 of the management server 18 is in the event wait status and a change event is sent from the controller 72, the processor 92 receives the change event, in accordance with the contents of the received change event, determines whether the page allocation is changed or not (S12), returns to the processing at step S11 if the page allocation is not changed or, if the page allocation is changed, acquires the page/external volume correspondence management table 106 and, in accordance with the contents of the changed page allocation, updates the page/external volume correspondence management table 106 (S13).

Next, the processor 92 performs the processing for determining the distribution destination of the page/external volume correspondence management table 106 and the distributed data (S14).

For example, the processor 92 considers the distribution destination to be the management server for managing the external storage described in the external storage field 178, for example, if an external storage is a "storage 2," considers the management server 20 to be the distribution destination, and considers the distributed data to be the data described in the line (entry) where the "storage 2" is stored in the entry of the external storage field 178 (data from page 1 to page 5) (S14).

Next, the processor 92 sends the distributed data divided from the page/external volume correspondence management table 106 to the management server 20 which is the distribution destination (S15).

At this time, in the management server 20, the processor 108 starts up the page/external volume correspondence management program 100, receives the changed data (distributed data) from the management server 18 (S31) and, in accordance with the received changed data, updates the contents of the page/external volume correspondence management table 106 (S32).

Meanwhile, the processor 92 of the management server 18, after sending the distributed data to the management server 20, determines whether the page allocation control is completed or not (S16), if the page allocation control is not completed, returns to step S11 and repeats the processing of steps from S11 to S16, or, if the entire page allocation control is completed, terminates the processing of this routine. By this method, the contents of the page/external volume correspondence management tables 106 of the management servers 18, 20 become the same.

Next, the processing of the page allocation control program 80 in the storage apparatus 14 is described with reference to the flowchart of FIG. 9.

The controller 72 in the storage apparatus 14 starts up the page allocation control program 80 to start the processing, performs the event wait processing (S41), if an event occurs, determines whether a specific tier is unavailable due to a failure or not (S42), and returns to step S41 if [the tier is] available, or proceeds to the processing at step S43 if [the tier is] unavailable.

At step S43, the controller 72, if the specific tier is unavailable due to a failure, acquires the information related to the normal tiers from the page allocation management table 90 (S43), and sets the tier priority sequentially (S44).

For example, if the tier (2) becomes unavailable due to a failure, [the program] performs the processing for changing the tier (3) to the tier (2).

Subsequently, the controller 72 updates the tier definition of the page allocation management table 90 (S45), and terminates the processing of this routine.

Next, the processing of the virtual volume recovery analysis program 116 is described with reference to the flowchart of FIG. 20.

This processing is performed for determining whether data recovery is possible or not in the case a failure occurs.

Firstly, the processor 108 in the management server 20 starts up the virtual volume recovery analysis program 116 to start the processing, performs the processing for acquiring an event (S51), and requires the storage failure monitoring program 102 of the management servers 18, 20 to send a failure event.

At this time, the processor 92 in the management server 18 starts up the storage failure monitoring program 102, collects the information whether a failure occurred in the storage apparatus 14 or not and, if a failure occurred in the storage apparatus 14, sends a failure event to the management server 20 (S71).

The processor 108 in the management server 20, if receiving a failure event from the management server 18, updates the information of the storage failure management table 120 in accordance with the contents of the received failure event (S52), determines whether an unusual status exists or not in accordance with the updated information (S53) and, if [the status is] normal, returns to the processing at step S51 and repeats the processing of steps from S51 to S53.

Meanwhile, in accordance with the updated information, if determining that an unusual status occurred in the storage apparatus 14, the processor 108 identifies the failure level and, as the processing complying with the level, performs the processing for a link down in the case of a link down (S54), performs the processing for a line QoS violation in the case of a line QoS violation (S55), or acquires the page/external volume correspondence management table 106 in the case of a total functional shutdown (S56).

If acquiring the information of the page/external volume correspondence management table 106 at step S56, the processor 108, in accordance with the latest information stored in the page/external volume correspondence management table 106, for all the virtual volumes in the storage apparatus 14, performs the processing of steps from S57 to S61.

As more specifically described, the processor 108, for determining whether a virtual volume set for the storage apparatus 14 includes a page in the internal volume or not, determines whether the virtual volume includes a page in the internal volume; that is, a page to which a pool volume configured of the logical volumes 64, 66 is assigned or not (S58).

At this step, if a pool volume configured of the logical volumes 64, 66 is assigned to a page, as this virtual volume cannot be recovered, the processor 108 counts [the virtual volume] as impossible to recover (S59), returns to step S57 or, if the virtual volume does not include a page in the logical volumes 64, 66 as the internal volumes, counts [the virtual volume] as possible to recover (S60) and, after step S61, updates the virtual volume recoverability determination table 122 (S62). By this method, the result of the update will be stored in the entry of the recoverability field 220 in the virtual volume recoverability determination table 122 shown in FIG. 15.

Next, the processor 108 determines whether one or more virtual volumes which can be recovered exist or not (S63) and, if determining that one or more virtual volumes which can be recovered exist, proceeds to the processing of the virtual volume recovery control program (S64) or, if one or more virtual volumes which can be recovered do not exist, terminates the processing of this routine.

Note that, though it is determined at step S58 whether the virtual volume includes a page in the internal volume, in this case, by referring to the contents of the entry in the status field 218 ("normal" or "failure") of the virtual volume recoverability determination table 122 shown in FIG. 15, it is also possible to determine whether the virtual volume can be recovered or not.

Next, the processing of the virtual volume recovery analysis program 116 in the case of a link down is described with reference to the flowchart of FIG. 21. This processing shows the concrete contents of step S54 shown in FIG. 20.

Firstly, if determining the failure level to be a link down, the processor 108 acquires the page/external volume correspondence management table 106 (S81) and, for all the virtual volumes in the storage apparatus 14, performs the processing of steps from S82 to S86.

As more specifically described, the processor 108, for the virtual volumes set for the storage apparatus 14, determines whether [the virtual volumes] include the pages only in any of the external volumes 68 which cannot be connected to the internal volumes (logical volumes 64, 66) or not (S83).

That is, the processor 108 determines whether a page including the external volumes 68 and the internal volumes exists or not and, if a page including the external volumes 68 and the internal volumes exists, counts [the virtual volume] as impossible to recover (S84) and returns to the processing of step S82 or, if only the internal volumes or only the external volumes 68 exist in the page, counts the virtual volume as possible to recover (S85) and, after step S86, updates the contents of the virtual volume recoverability determination table 122 (S87). By this method, the result of the update will be stored in the entry of the recoverability field 220 in the virtual volume recoverability determination table 122 shown in FIG. 16.

Subsequently, the processor 108 determines whether one or more virtual volumes which can be recovered exist or not (S88) and, if determining that one or more virtual volumes which can be recovered exist, performs the processing of the virtual volume recovery control program (S89) or, if one or more virtual volumes which can be recovered do not exist, terminates the processing of this routine.

Note that, at step S83, by referring to the contents of the entry in the status field 218 ("link down" or "normal") of the virtual volume recoverability determination table 122 shown in FIG. 16, it is also possible to determine whether the virtual volume can be recovered or not.

Next, the processing of the virtual volume recovery analysis program 116 in the case of a line QoS violation is described with reference to the flowchart of FIG. 22.

Figure 20:
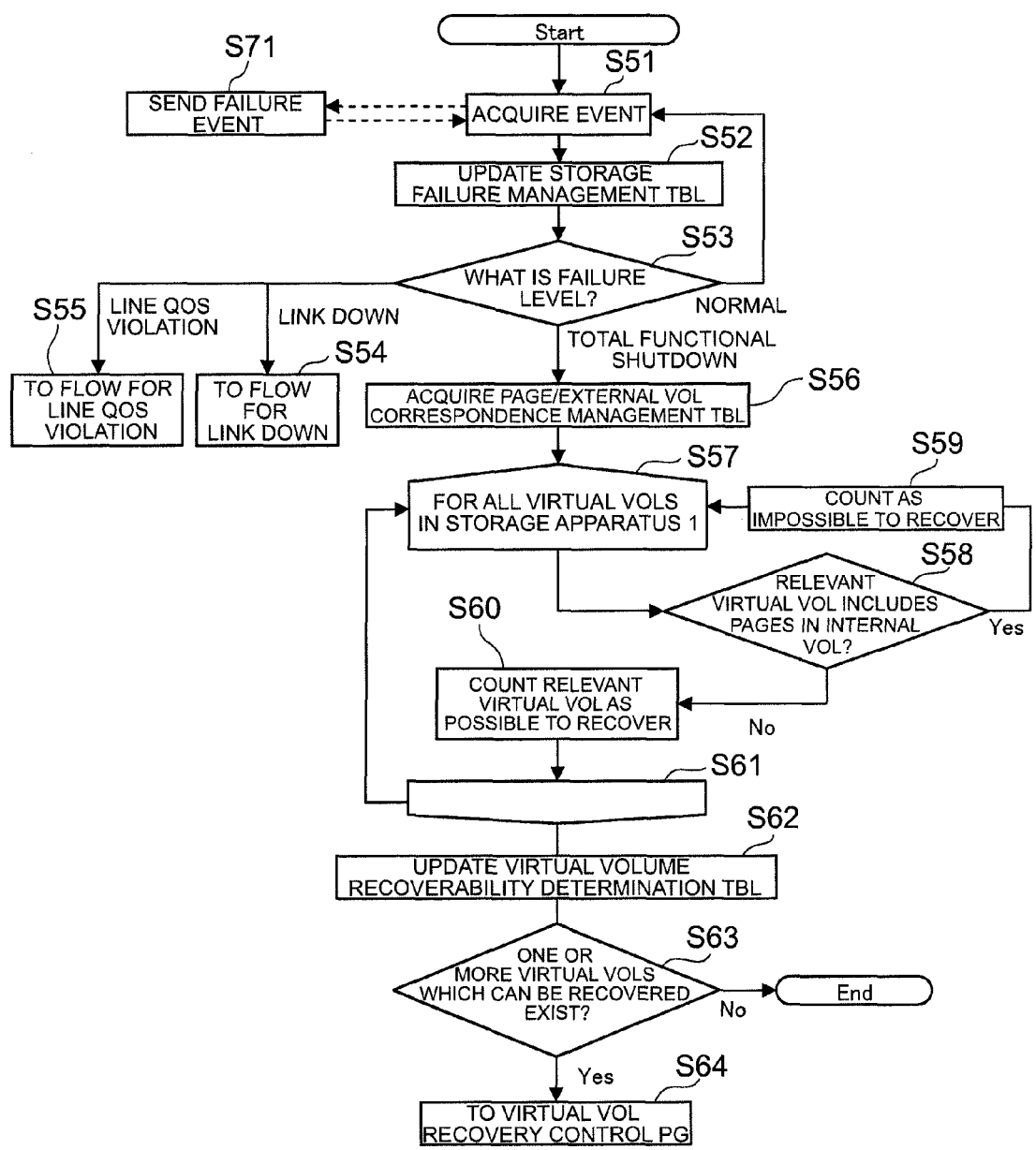
FIG. 20 is a flowchart explaining the processing of a virtual volume recovery analysis program.

This processing shows the concrete contents of step S55 shown in FIG. 20.

Firstly, if determining the failure level to be line QoS violation, the processor 108 acquires the page/external volume correspondence management table 106 (S91) and, for all the virtual volumes in the storage apparatus 14, performs the processing of steps from S92 to S96.

As more specifically described, the processor 108, for the virtual volumes set for the storage apparatus 14, determines whether [the virtual volumes] include the pages configured only of any of the internal volumes (logical volumes 64, 66) and the external volumes 68 where a line QoS violation occurred or not (S93).

That is, the processor 108 determines, for the virtual volume set for the storage apparatus 14, among pages set for the pool 62, whether a page which includes the pool volume configured of the external volumes 68 and the internal volumes (logical volumes 64, 66) exists or not.

At this step, the processor 108, if a pool volume configured of the internal volumes and the external volumes 68 exists in the page, counts page reallocation to be necessary for this page (S94) and returns to the processing of step S92 or, if a pool volume configured of only the external volumes 68 or only the internal volumes exist in the page, counts page reallocation to be unnecessary for this page (S95) and, after step S96, updates the virtual volume recoverability determination table 122 (S97). By this method, the contents of the entry of the page reallocation necessity field 222 in the virtual volume recoverability determination table 122 shown in FIG. 17 is updated.

Subsequently, the processor 108 determines whether one or more virtual volumes for which page reallocation is necessary exist or not (S98) and, if one or more virtual volumes for which page reallocation is necessary exist, performs the processing of the virtual volume recovery control program 118 (S99) or, if one or more virtual volumes for which page reallocation is necessary do not exist, terminates the processing of this routine.

Note that, at step S93, by referring to the information of the entry in the status field 218 ("QoS violation" or "normal") of the virtual volume recoverability determination table 122 shown in FIG. 17, it is also possible to determine whether page reallocation is necessary for the virtual volume or not.

Next, the processing of the virtual volume recovery control program 118 is described with reference to the flowchart of FIG. 23.

Figure 21:
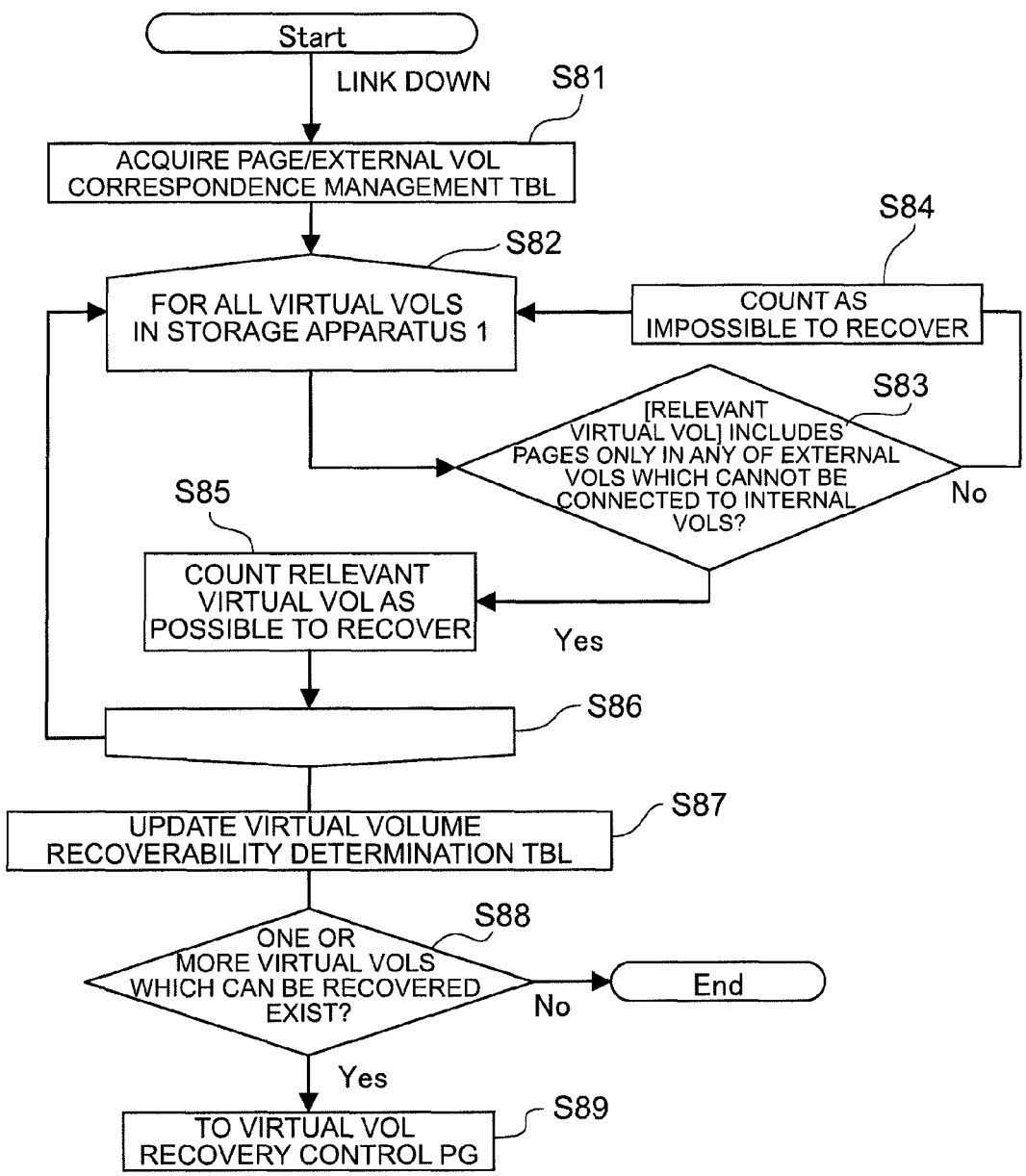
FIG. 21 is a flowchart explaining the processing of the virtual volume recovery analysis program in the case of a link down.
Figure 22:
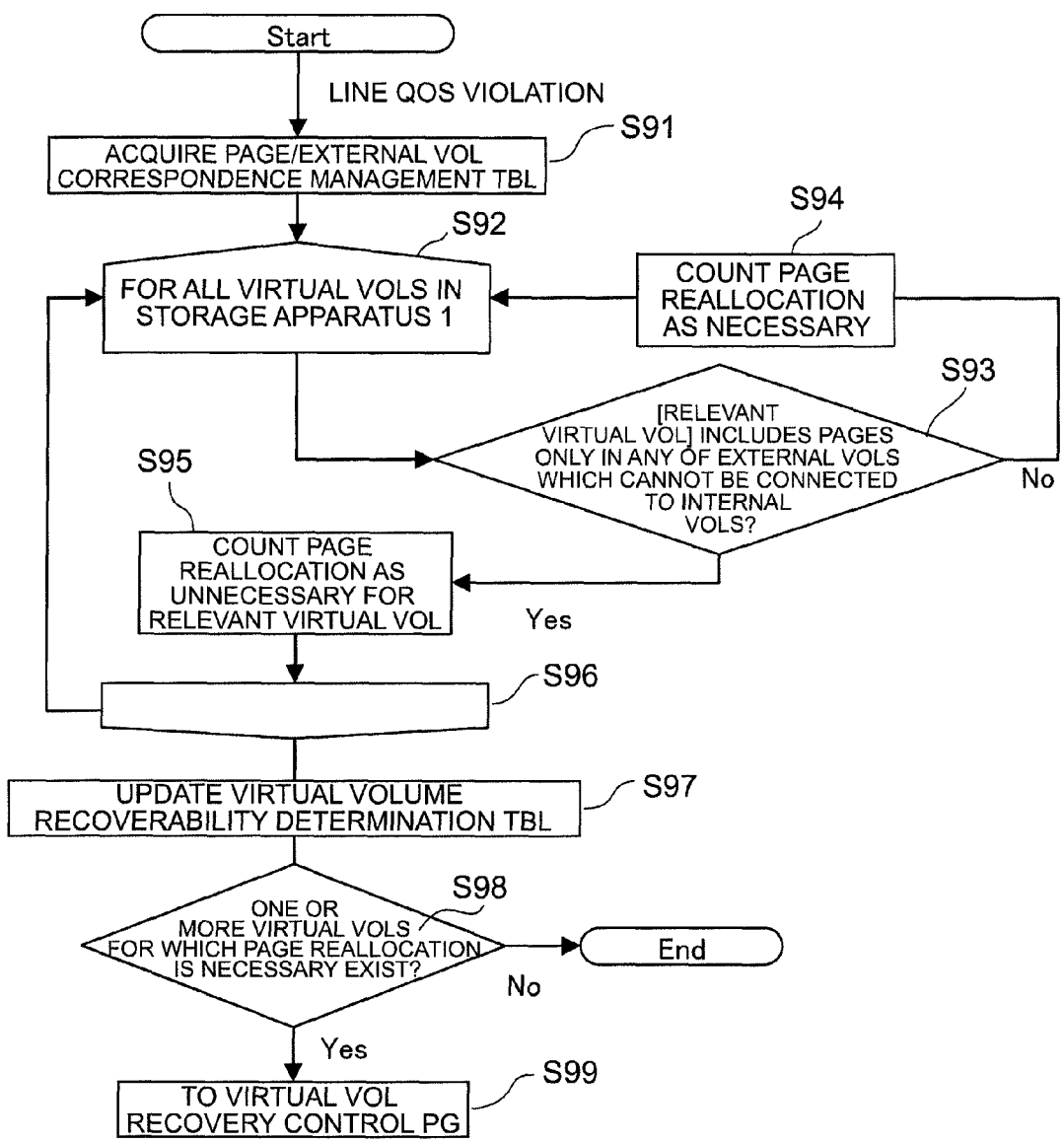
FIG. 22 is a flowchart explaining the processing of the virtual volume recovery analysis program in the case of a line QoS violation.

This processing shows the concrete contents of step S64 in FIG. 20, step S89 in FIG. 21, and step S99 in FIG. 22.

Firstly, for recovering the virtual volume, the processor 108 acquires the page/external volume correspondence table 106 (S101), and decides a pool/virtual volume creation policy in the storage apparatus 16 (S102). Note that this policy decision processing is described by the flowchart in FIG. 24.

Next, the processor 108 creates a pool 144 in the storage apparatus 16 in accordance with the decided policy (S103), and next, creates a virtual volume 142 in accordance with the creation policy (S104), and performs the processing for reallocating the pages in the virtual volume 142 (S105).

At this step, the processor 108, in accordance with the configuration information indicating the correspondence relationship between the virtual volumes 54 to 60 created in the storage apparatus 14 and the external volumes 68, performs the processing for reallocating the multiple pages in the pool 144 and, for the respective pages, performs the processing for assigning logical volumes 70.

In this case, if a pool volume configured of internal volumes (logical volumes 64, 66) and a pool volume configured of external volumes 68 are assigned to the pages of the pool 62, to the pages newly set for the pool 144, it is possible to assign a pool volume configured of internal volumes only or to assign a pool volume configured of external volumes 68 only. At this step, the processor 108 can also instruct the controller 72 of the storage apparatus 14 or the processor 92 of the management server 18 to perform page reallocation.

Next, the processor 108 applies the updated contents of the page/external volume correspondence management table 106 to the page allocation management table 90, and updates the contents of the page allocation management table 90 (S106).

Next, the processor 108 determines the failure level with reference to the storage failure management table 120 and, if determining the failure level to be total functional shutdown or link down, from the virtual volume, deletes the pages which do not have to be referred to from the external volumes (S108). Note that this processing is not applied to the cases of link down.

That is, if a pool volume configured of internal volumes and a pool volume configured of external volumes are assigned to the page corresponding to the virtual volume, as the internal volumes cannot be used due to a failure, and the pages for which the internal volumes are set are not referred to, for the pages including the internal volumes, [the processor 108] is supposed to delete the pool volumes configured of internal volumes and prevent the unnecessary increase of the capacity.

Next, the processor 108 associates the virtual volume 142 with the host volume 140, and also outputs an instruction to the host computer 12 for switching the path connecting the host volume 140 and the virtual volume 40 to the path connecting the host volume 140 and the virtual volume 142 (S109).

Meanwhile, if determining the failure level to be line QoS violation, the processor 108, for reducing the effect on the host computers 10, 12, causes the host computers 10, 12 to terminate host I/O to the virtual volumes 54 to 60 (S110), causes [the host computers] to perform the cache destaging processing for outputting all the data in the cache 78 (S111), as well as associates the virtual volume 142 with the host volume 140, outputs an instruction to the host computer 12 for switching the path connecting the host volume 140 and the virtual volume 60 to the path connecting the host volume 140 and the virtual volume 142 (S112) and, considering the virtual volume 142 to be the migration destination virtual volume, instructs the host computer 12 to resume host I/O (S113).

Next, the processor 108, except the cases of total functional shutdown, deletes the virtual volumes 54 to 60 in the storage apparatus 14 (S114), disconnects the link between the external volumes 68 and the logical volumes 70 (S115), and terminates the processing of this routine.

Note that, at step S112, by the path management program (not shown in the figure) rewriting the SCSI Inquiry of the volume issued by the OS in the management server 20, it is also possible to switch the path to the side of the storage apparatus 16 without changing the setting of the OS side.

Figure 24:
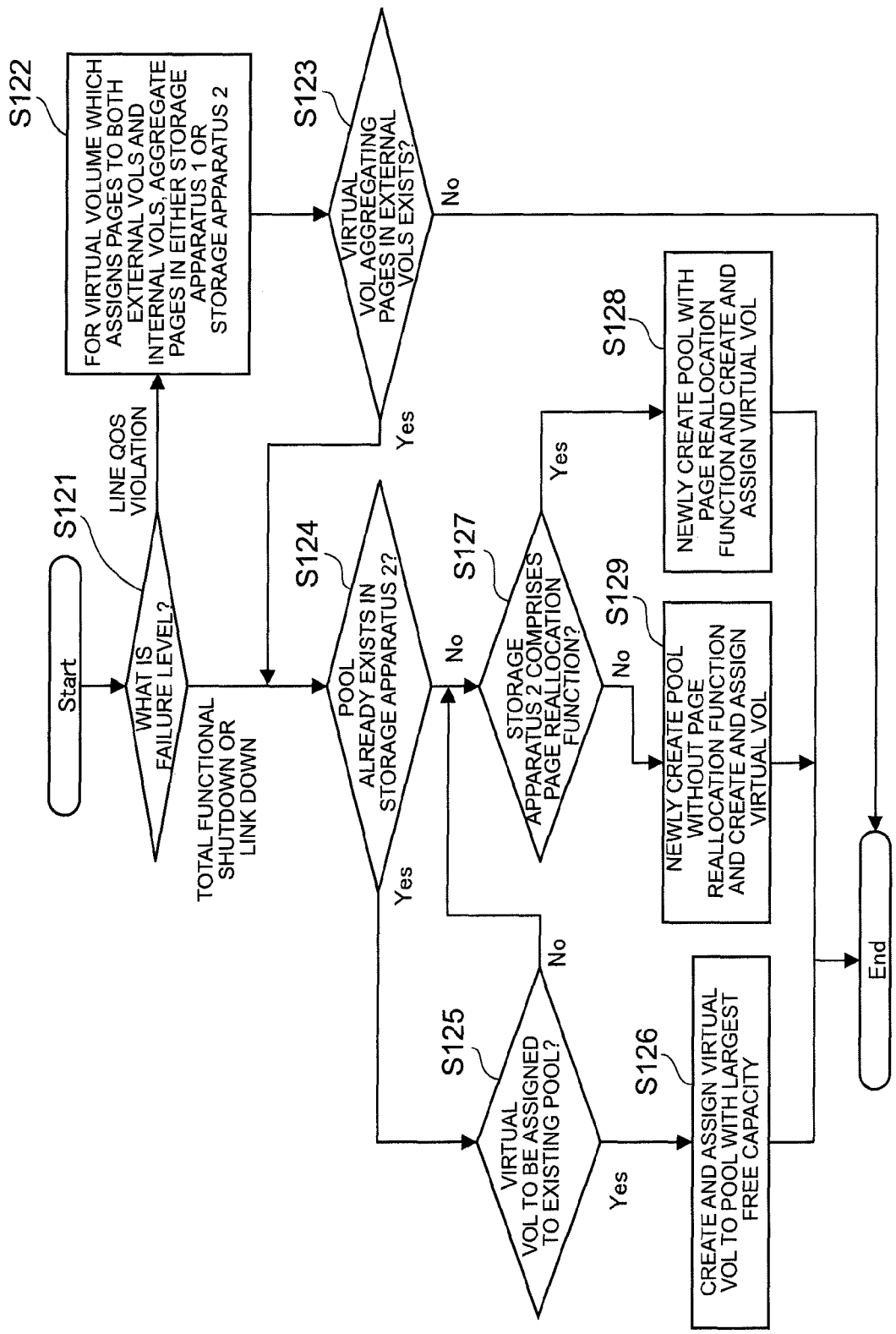
FIG. 24 is a flowchart explaining the pool/virtual volume creation policy decision processing.

Next, the processing of the pool/virtual volume creation policy decision processing is described with reference to the flowchart of FIG. 24.

Figure 23:
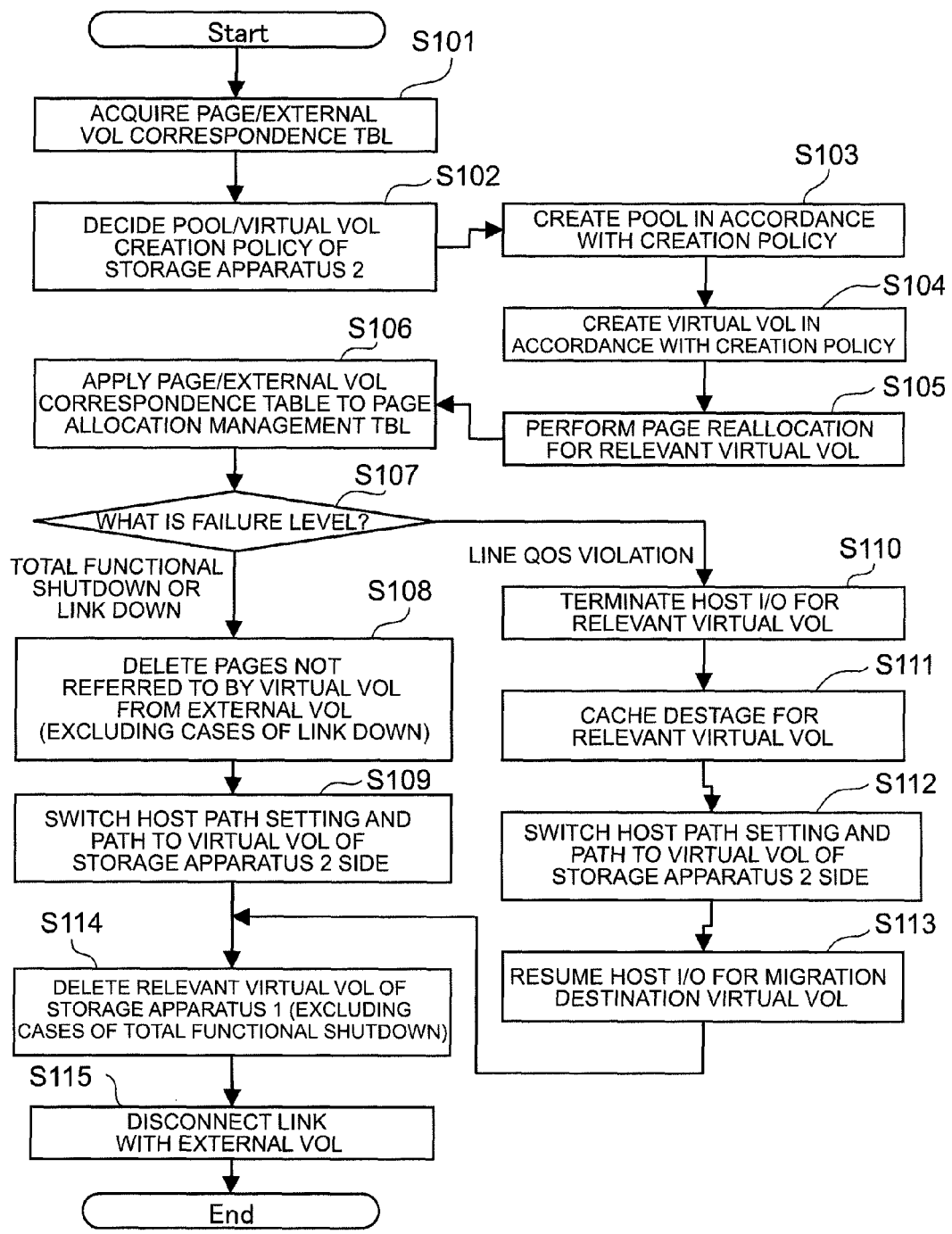
FIG. 23 is a flowchart explaining the processing of the virtual volume recovery control program.

This processing shows the concrete contents of step S102 shown in FIG. 23.

Firstly, the processor 108 determines the failure level with reference to the storage failure management table 120 (S121) and, if determining the failure level to be line QoS violation, for the virtual volume which assigns pages to both the external volumes and the internal volumes, performs the processing for aggregating the pages in either the storage apparatus 14 or the storage apparatus 16 (S122).

For example, if, among the pages in the pool 62, a page to which pool volumes configured of logical volumes 64, 66 as internal volumes and pool volumes configured of external volumes 68 are respectively assigned exists and, if, among the volumes assigned to this page, the number of the pool volumes configured of internal volumes is larger, only the pool volumes configured of external volumes 68 are assigned to the page of the pool 144.

Meanwhile, if a page to which pool volumes configured of logical volumes 64, 66 as internal volumes and pool volumes configured of external volumes 68 are respectively assigned exists and if, among the volumes assigned to this page, the number of the pool volumes configured of external volumes 68 is larger, after the pool volumes configured of logical volumes 64, 66 and the pool volumes configured of external volumes 68 are assigned to the page of the pool 144, the pool volumes configured of logical volumes 64, 66 are deleted from this page.

Next, the processor 108 determines whether the virtual volume aggregating the pages in the external volumes 68 exists or not (S123) and, if [the virtual volume] exists, proceeds to the processing at step S124 or, if [the virtual volume] does not exist, terminates the processing of this routine.

Meanwhile, the processor 108, if at step S121 determining the failure level to be total functional shutdown or link down, determines whether the pool 144 already exists in the storage apparatus 16 (S124), if determining the pool 144 to exist already, determines whether to assign the virtual volume 142 to the existing pool 144 (S125), if determining to assign the virtual volume 142 to the existing pool 144, creates the virtual volume 142 for the pool 144 with the largest remaining capacity, assigns the created virtual volume 142 to the pool 144 (S126), and terminates the processing of this routine.

Meanwhile, the processor 108, if at step S124 determining that the pool does not exist in the storage apparatus 16 already, or if at step S125 determining it unnecessary to assign the virtual volume to the existing pool, determines whether the storage apparatus 16 comprises the page reallocation function or not (S127).

The processor 108, if determining at step S127 that [the storage apparatus 16] comprises the page reallocation function, newly creates a pool 144 comprising the page reallocation function in the storage apparatus 16, creates and assigns a virtual volume 142 to the created pool 144 (S128), and terminates the processing of this routine or, if determining that the storage apparatus 16 does not comprise the page reallocation function, newly creates a pool 144 not comprising the page reallocation function in the storage apparatus 16, creates and assigns a virtual volume 142 to the created pool 144 (S129), and terminates the processing of this routine.

According to this embodiment, even if an unusual status occurs in the storage apparatus 14, by storing the configuration information indicating the correspondence relationship between the external volumes 68 and the virtual volume 60 in the management server 20 or by the management server 20 acquiring the same from the controller 72, the management server 20, in accordance with the stored or acquired configuration information, can recover the data of the pages including the external volumes 68 in the pool volumes; that is, the data of the virtual volume 60 to which the external volumes 68 were assigned.

Figure 25:
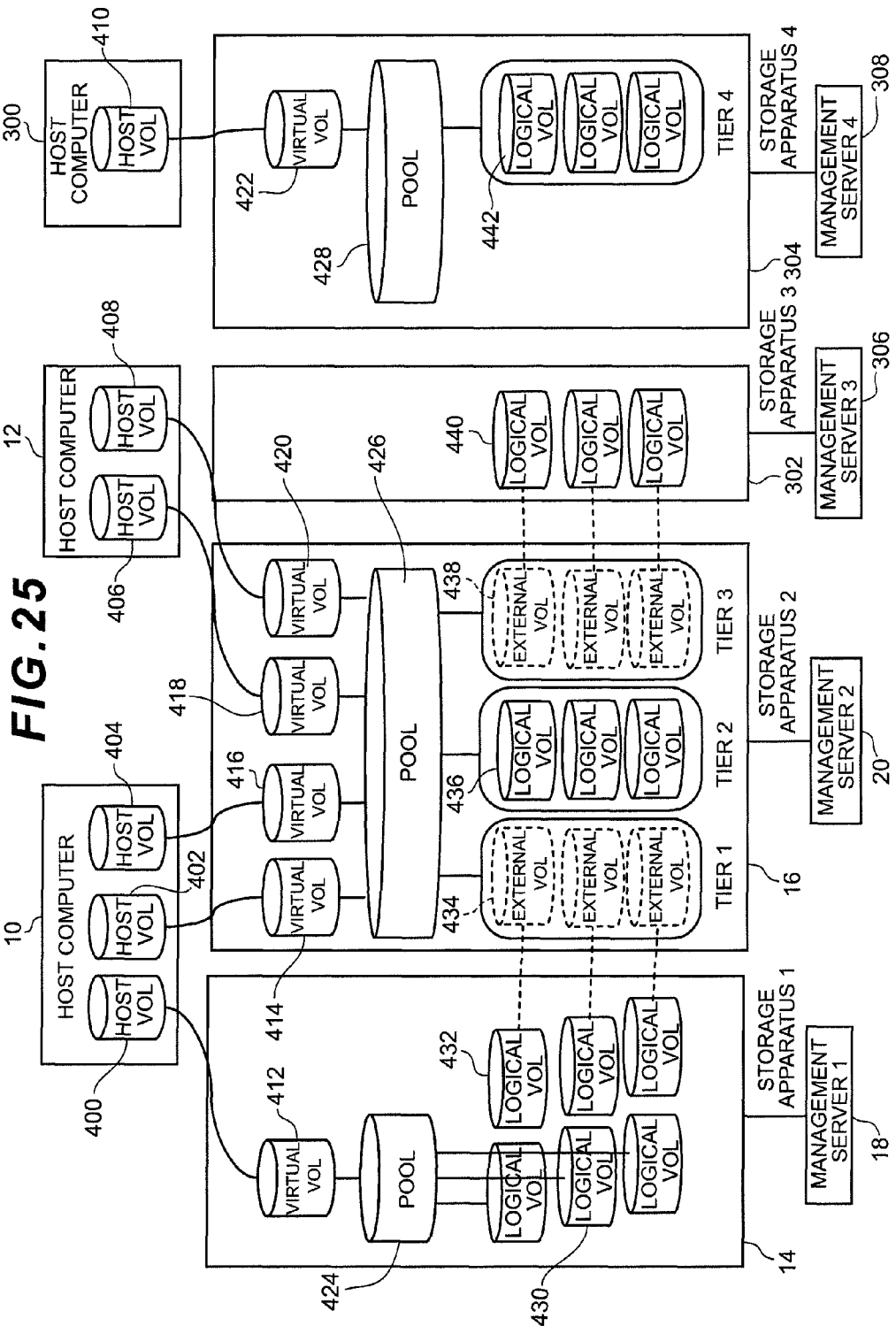
FIG. 25 is a conceptual diagram explaining the skeleton framework of the computer system in the second embodiment.

Next, the skeleton framework of the computer system in the second embodiment is shown in FIG. 25. In this embodiment, among multiple management servers which manage multiple storage apparatuses respectively, the fourth management server is a master while the first to third management servers operate as slaves, the fourth management server stores the configuration information indicating the correspondence relationship between the first virtual volume set for the first storage apparatus and the external logical volume configured of storage devices of the second storage apparatus, if an unusual status occurs in the first storage apparatus 1, creates a second virtual volume in the fourth storage apparatus, in accordance with the stored configuration information, associates the second virtual volume with the internal logical volume in the second storage apparatus which were assigned as an external logical volume to the first storage apparatus, provides the second volume to the host computer whose access target is the first virtual volume, and recovers the data of the virtual volume to which the external logical volume was assigned.

The computer system in the second embodiment, as shown in FIG. 25, in addition to the host computers 10, 12, comprises a third host computer 300, also, in addition to the storage apparatuses 14, 16, comprises a storage apparatus (third storage apparatus) 302 and a fourth storage apparatus (fourth storage apparatus) 304, further, in addition to the management servers 18, 20, comprises a management server (third management server) 306 for managing the storage apparatus 302 and a management server (fourth management server) 308 for managing the storage apparatus 304 and, in this embodiment, is supposed to use the management server 308 as a master and to use the other management servers 18, 20, 306 as slaves.

Host volumes 400, 402, 404 are assigned to the host computer 10, host volumes 406, 408 are assigned to the host computer 12, a host volume 410 is assigned to the host computer 300 and, to the respective host volumes, the virtual volumes 412 to 422 are made to correspond.

The virtual volume 412 is allocated in the storage apparatus 14 and a pool 424 is made to correspond to the same. If a write access for the virtual volume 412 occurs from the host computer 10 and the controller in the storage apparatus 14 starts up the capacity virtualization control program, to each of the pages in the pool 424, from a logical volume (internal volume) 430 created of the storage devices belonging to the storage apparatus 14, the storage area of the same is assigned as a pool volume.

Virtual volumes 414 to 420 are created in the storage apparatus 16, connected to the host volumes 402 to 408 respectively, and a pool 426 is assigned to the same. If a write access for the virtual volumes 414 to 420 occurs from the host computer 10 or the host computer 12 and the controller in the storage apparatus 16 starts up the capacity virtualization control program, to each of the pages in the pool 426, from any volume of external volumes 434 belonging to the tier 1, logical volumes 436 belonging to the tier 2, and external volumes 438 belonging to the tier 3, the storage area of the same is assigned as a pool volume.

To the external volumes 434, the logical volumes 432 created of storage devices in the storage apparatus 14 are made to correspond and, to the external volumes 438, the logical volumes 440 created of storage devices in the storage apparatus 302 are made to correspond.

The virtual volume 422 is created in the storage apparatus 304, connected to the host volume 410, and a pool 428 is made to correspond to the same. If a write access for the virtual volume 422 occurs from the host computer 300 and the controller in the storage apparatus 304 starts up the capacity virtualization control program, to each of the pages in the pool 428, from logical volumes 442 configured of storage devices in the storage apparatus 304, the storage area of the same is assigned as a pool volume.

Figure 26:
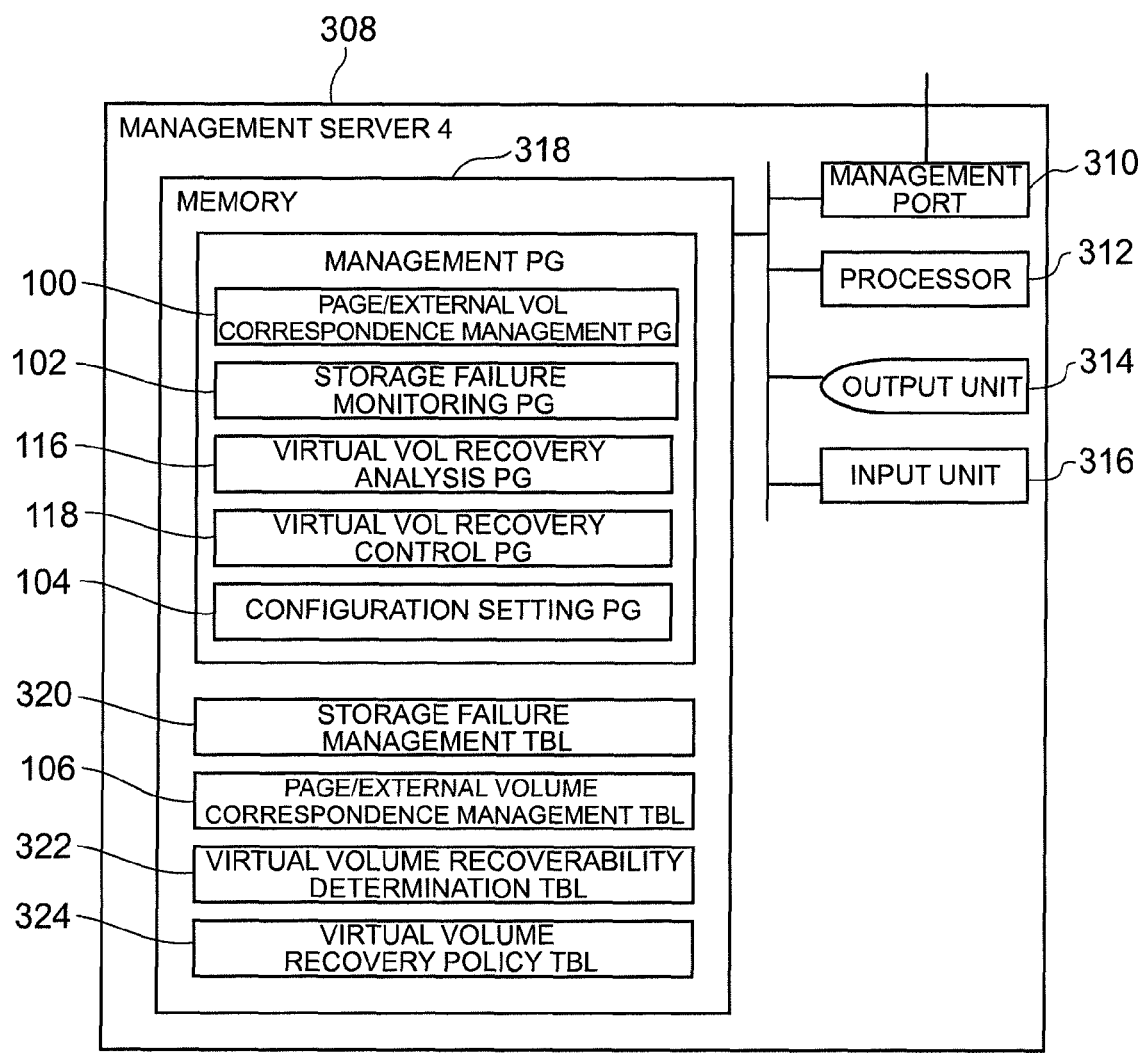
FIG. 26 is a block configuration diagram of a management server 4.

Next, the configuration of the management server 308 is shown in FIG. 26.

The management server 308 comprises a management port 310, a processor 312, an output unit 314 including a display device, an input unit 316 including input devices such as a mouse and others, and a memory 318, and the management port 310 is, via the management network 26, connected to the management servers 18, 20, 306 and the storage apparatuses 14, 16, 302, 304.

In the memory 318, as management programs, the page/external volume correspondence management program 100, the storage failure monitoring program 102, the virtual volume recovery analysis program 116, the virtual volume recovery control program 118, and the configuration setting program 104 are stored, and further the storage failure management table 320, the page/external volume correspondence management table 106, the virtual volume recoverability determination table 322, and the virtual volume recovery policy table 324 are stored.

The processor 312 performs the processing in accordance with the programs stored in the memory 318, sends/receives information to/from the management servers 18, 20, 308, and also sends/receives information to/from the storage apparatuses 14, 16, 302, 304.

Figure 27:
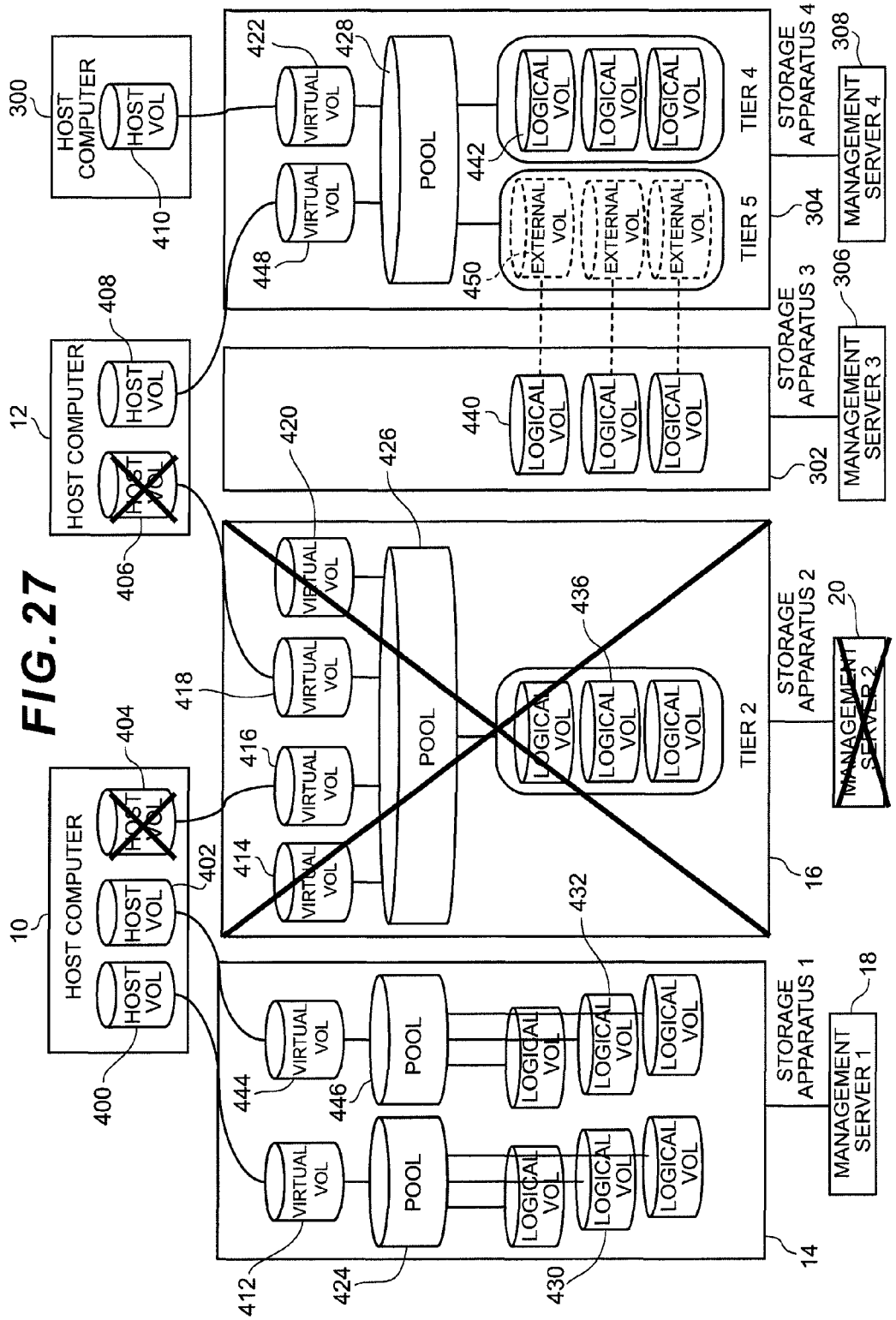
FIG. 27 is a conceptual diagram explaining the processing of the computer system in the second embodiment.

FIG. 27 shows the overview of the processing of the computer system in this embodiment.

Firstly, the processor 312 of the management server 308, in the course of sending/receiving information to/from the management servers 18, 20, 306, if the entire system including the management server 20 and the storage apparatus 16 is in the total functional shutdown status, notifies the status to the management servers 18, 306, and starts the processing accompanying the total functional shutdown of the storage apparatus 16.

The processor 92 of the management server 18 creates a virtual volume 446 in the normal storage apparatus 14 as well as creates a pool 446, associates the pool 446 with the virtual volume 444 as well as assigns pool volumes configured of logical volumes 432 to the respective pages of the pool 446, and provides the virtual volume 444 to the host computer 10 as well as outputs an instruction to the host computer 10 for switching the path connecting the host volume 402 and the virtual volume 414 to the path connecting the host volume 402 and the virtual volume 444.

Meanwhile, the processor 312 of the management server 308 sends/receives information to/from the management server 306, determines whether the normal storage apparatus 302 comprises the capacity virtualization function (the processing function by starting up the capacity virtualization control program) or not and, if the storage apparatus 302 does not comprise the capacity virtualization function, creates a logical volume which is a logical volume configured of storage devices of the normal storage apparatus 304 and belongs to the tier 5 as an external volume 450, and associates the external volume 450 with the logical volume 440 of the storage apparatus 302.

Furthermore, the processor 312 of the management server 308, for recovering the data of the logical volume 444 i.e. the data of the virtual volume 420 to which the external volume 438 was assigned, creates a virtual volume 448 of the same configuration as the virtual volume (the virtual volume for which the logical volume 444 was set corresponding to the external volume 438) 420, associates the virtual volume 448 with the pool 428, and outputs an instruction to the host computer 12 for switching the path connecting the host volume 408 and the virtual volume 420 to the path connecting the host volume 408 and the virtual volume 448. At this step, the storage apparatus 304, at the time of write access from the host computer 12, by the controller starting up the capacity virtualization control program, to each of the pages in the pool 428 from the external volumes 450, can assign the storage area of the same as pool volumes.

By this method, the host computer 12, by outputting an access request in which the access target is the virtual volume 448 to the storage apparatus 304, can access the data of the logical volume 440, which is the data of the page including the external volume 450 in the pool volume and which is the data of the virtual volume 420 to which the external volume 438 was assigned.

As described above, even if an unusual status occurs in the storage apparatus 16 and the failure level of the same is total functional shutdown, for example, by storing the configuration information indicating the correspondence relationship between the external volume 438 and the virtual volume 420 in the management server 308, the management server 308 can recover the data of the page including the external volume 450 in the pool volume; that is, the data of the virtual volume 420 to which the external volume 438 was assigned.

Next, the configuration of the storage failure management table 320 is shown in FIG. 28. The storage failure management table 320 is configured of a storage apparatus field 350, a status field 352, a capacity virtualization field 354, an external connection field 356, a management server field 358, and a master field 360.

In an entry of the storage field 350, as the information for uniquely identifying a storage apparatus in the computer system, the name of the storage apparatus is stored. For example, "storage apparatus 1" is stored in the entry corresponding to the storage apparatus 14, "storage apparatus 2" is stored in the entry corresponding to the storage apparatus 16, "storage apparatus 3" is stored in the entry corresponding to the storage apparatus 306, and "storage apparatus 4" is stored in the entry corresponding to the storage apparatus 304.

In an entry of the status field 352, the information indicating the status of each storage apparatus is stored. For example, if a storage apparatus is in the normal status, in the entry corresponding to this storage apparatus, the information of "normal" is stored and, if a failure occurs in the storage apparatus, in the entry corresponding to this storage apparatus, the information of "failure" is stored.

In an entry of the capacity virtualization field 354, the information indicating whether a storage apparatus comprises the capacity virtualization function or not is stored. For example, if a storage apparatus comprises the capacity virtualization function, in the entry corresponding to this storage apparatus, the information of "possible" is stored and, furthermore, if page reallocation for the storage apparatus is possible, "(page reallocation)" is stored. Meanwhile, if the storage apparatus does not comprise the capacity virtualization function, in the entry corresponding to this storage apparatus, the information of "impossible" is stored.

In an entry of the external connection field 356, the information indicating whether a storage apparatus comprises the external connection function or not is stored. For example, if a storage apparatus comprises the external connection function, in the entry corresponding to this storage apparatus, the information of "possible" is stored and, if the storage apparatus does not comprise the external connection function, in the entry corresponding to this storage apparatus, the information of "impossible" is stored.

In an entry of the management server field 358, as the information for managing each storage apparatus, the name of a management server is stored. For example, "management server 1" is stored in the entry corresponding to the storage apparatus 14, "management server 2" is stored in the entry corresponding to the storage apparatus 16, "management server 3" is stored in the entry corresponding to the storage apparatus 302, and "management server 4" is stored in the entry corresponding to the storage apparatus 304.

In an entry of the master field 360, the information indicating whether a management server managing each storage apparatus is a slave or a master is stored. For example, if a management server is a slave, the information of "slave" is stored in this entry and, if a management server is a master, the information of "master" is stored in this entry.

Next, the configuration of the virtual volume recoverability determination table 322 is shown in FIG. 29.

The virtual volume recoverability determination table 322 is configured of a storage apparatus field 362, a virtual volume field 364, an operation host field 366, a pool volume (tier) field 368, a status field 370, and a recoverability field 372.

In an entry of the storage apparatus field 362, as the information for uniquely identifying a storage apparatus in the computer system, the name of the storage apparatus is stored. For example, in the entries corresponding to the storage apparatuses 14, 16, 304, "storage apparatus 1," "storage apparatus 2," and "storage apparatus 4" are stored.

In an entry of the virtual volume field 364, an identifier for identifying a virtual volume created in each storage apparatus is stored. For example, "VVOL 1" is stored in the entry corresponding to the virtual volume 412, and "VVOL 2" to "VVOL 5" are respectively stored in the entries corresponding to the virtual volumes 414 to 420.

In an entry of the operation host field 366, the name of a host computer for uniquely identifying the host computer in the computer system is stored. For example, "host 1" is stored in the entry corresponding to the host computer 10, "host 2" is stored in the entry corresponding to the host computer 12, and "host 3" is stored in the entry corresponding to the host computer 300.

In an entry of the pool volume field 368, an identifier of a pool volume to be assigned to each of the virtual volumes 412 to 422 is stored. At this step, if the pool volume is configured of internal volumes, "internal" is stored while, if the [pool volume is] configured of external volumes, the information of "external" is also stored.

For example, in the entry corresponding to a VVOL 1 (virtual volume 412), pool volumes configured of logical volumes 430 are stored as "VOL 1, 2, 3 (internal)."

In the entry corresponding to a VVOL 2 (virtual volume 414), pool volumes configured of external volumes 434 are stored as "VOL 4, 5, 6 (external)" and, in the entry corresponding to a VVOL 3 (virtual volume 416), pool volumes configured of external volumes 434 are stored as "VOL 4, 5, 6 (external)" while the pool volumes configured of logical volumes 436 are stored as "VOL 7, 8, 9 (internal)."

Similarly, in the entry corresponding to a VVOL 4 (virtual volume 418), pool volumes configured of external volumes 434 are stored as "VOL 4, 5, 6 (external)," pool volumes configured of logical volumes 436 are stored as "VOL 7, 8, 9 (internal)," and pool volumes configured of external volumes 438 are stored as "VOL 10, 11, 12 (external)." Furthermore, in the entry corresponding to a VVOL 5 (virtual volume 420), pool volumes configured of external volumes 438 are stored as "VOL 10, 12, 12 (external)" and, in the entry corresponding to a VVOL 6 (virtual volume 422), pool volumes configured of logical volumes 442 are stored as "VOL 13, 14, 16 (internal)."

In an entry of the status field 370, the information indicating the status of each pool volume is stored. For example, if a pool volume is normal, the information of "normal" is stored in this entry while, if a failure occurs in the pool volume, the information of "failure" is stored in this entry In an entry of the recoverability field 372, among the virtual volumes 412 to 422, for [the virtual volumes] which can be recovered, the information of "possible" is stored while, for

[the virtual volumes] which cannot be recovered, the information of "impossible" is stored. Note that, for the virtual volumes which the management server 308 does not have to recover by using the storage apparatus 304, the information of "unnecessary" is stored.

Next, the configuration of the virtual volume recovery policy table 324 is shown in FIG. 30.

The virtual volume recovery policy table 324 is configured of an external connection function providing storage field 374, an external storage apparatus field 376, and an external connection function for recovery providing storage field 378, wherein the external connection function providing storage field 374 is configured of a storage apparatus field 380 and a virtual volume field 382, the external storage apparatus field 376 is configured of a storage apparatus field 384, a logical volume field 386, a capacity virtualization field 388, and a virtual volume field 390, and the external connection function for recovery providing storage field 378 is configured of a storage apparatus field 392, an external volume field 394, and a virtual volume field 396.

In an entry of the storage apparatus field 380, as the information of a storage apparatus capable of providing the external connection function, the name of the storage apparatus is stored. For example, if the storage apparatus 16 is the storage apparatus capable of providing the external connection function, "storage apparatus 2" is stored in this entry.

In an entry of the virtual volume field 382, an identifier of a virtual volume belonging to the storage apparatus is stored. For example, as the identifiers of the virtual volumes belonging to the storage apparatus 16, "VVOL 2," "VVOL 5" are stored. At this step, in these entries, the identifiers of the virtual volumes for which the information of "possible" is stored in the entries of the recoverability field 372 of the virtual volume recoverability determination table 322 are stored.

In an entry of the storage apparatus field 384, the name of a storage apparatus which was externally connected to the storage apparatus is stored. For example, as the names of the storage apparatuses 14, 302 which were externally connected to the storage apparatus 16, the information of "storage apparatus 1," "storage apparatus 3" is stored.

In an entry of the logical volume field 386, an identifier of a logical volume belonging to the storage apparatus is stored. For example, as the identifiers of the logical volumes belonging to the storage apparatuses 14, 302, the logical volumes 430 of the storage apparatus 14 are stored as "VOL 16, 17, 18," and the logical volumes 440 of the storage apparatus 302 are stored as "VOL 19, 20, 21."

In an entry of the capacity virtualization field 388, if a storage apparatus comprises the capacity virtualization function, the information of "possible" is stored while, if [capacity virtualization] is impossible, the information of "impossible" is stored. In this case, as the storage apparatus 14 comprises the capacity virtualization function, the information of "possible" is stored in the entry corresponding to the storage apparatus 14. As the storage apparatus 302 does not comprise the capacity virtualization function, the information of "impossible" is stored in the entry corresponding to the storage apparatus 302.

In an entry of the virtual volume field 390, an identifier of the virtual volume created in each storage apparatus is stored. For example, as a virtual volume corresponding to the storage apparatus 14, the virtual volume 42 is stored as a "VVOL 7." Note that, as no virtual volume exists in the storage apparatus 302, the information of "–" is stored.

In an entry of the storage apparatus field 392, the name of a storage apparatus comprising the external connection function for recovery is stored. For example, if the storage apparatus 304 can be used as a storage comprising the external connection function for the storage apparatus 302, in the entry corresponding to the storage apparatus 302, the information of "storage apparatus 4" is stored.

In an entry of the external volume field 394, the identifier for identifying external volumes of the virtual volume created in the storage apparatus is stored. For example, as the identifiers for identifying the external volumes of the virtual volume 422 created in the storage apparatus 304, the external volumes 450 are stored as "VOL 22, 23, 24."

In an entry of the virtual volume field 396, the identifier for identifying a virtual volume created in the storage apparatus is stored. For example, the virtual volume 448 used for the storage apparatus 304 is stored as "VVOL 8."

Next, the processing of the virtual volume recovery analysis program 116 in the management server 308 is described with reference to the flowchart of FIG. 31.

Firstly, the processor 312 in the management server 308 starts up the virtual volume recovery analysis program 116 to start the processing, and performs the processing of steps from S201 to S206 for all the storage apparatuses as the management target.

The processor 312 firstly acquires the page/external volume correspondence management tables 106 from the management servers 18, 20, 306 managing the respective storage apparatuses 14, 16, 302, in accordance with the information of the acquired tables, merges the same into the page/external volume correspondence management table 106 in the master (S202), performs the processing for acquiring events from the management target storage apparatuses 14, 16, 302 (S203), and requires the management target storage apparatuses 14, 16, 302 to send failure events (S203).

At this step, the management target storage apparatuses 14, 16, 302 start up the storage failure monitoring program 102, and send failure events including the information related to the existence of failures to the management server 308 (S221).

Meanwhile, the processor 312 of the management server 308, if receiving a failure event from [any of the] management target storage apparatuses 14, 16, 302, determines the failure level (S204), if determining [the level] to be normal, returns to step S201 and repeats steps from S201 to S204 or, if determining the failure level to be total functional shutdown, updates the contents of the storage failure management table 320 in accordance with the contents of the acquired failure event (S205), and then, at step S207, performs the processing described below for all the storage apparatuses where the failure occurred.

Firstly, the processor 312, for creating a measure with reference to the storage apparatus where the failure occurred, refers to the page/external volume correspondence management table 106 in the master (S208), and performs the processing of steps from S209 to S214 for all the storage apparatuses where the failure occurred.

As more specifically described, for example, the processor 312 determines whether the virtual volume in the storage apparatus where the failure occurred includes the pages in the internal volumes or not (S210), if determining that the virtual volume includes the pages in the internal volumes, counts the recovery as impossible (S211), and returns to the processing at step S209 or, if determining that the virtual volume does not include any pages in the internal volumes, counts the recovery as possible (S212), identifies the external volumes necessary for recovering the virtual volume and, in accordance with the identified external volume, updates the contents of the virtual volume recoverability determination table 322 (S213).

Subsequently, the processor 312 determines whether one or more virtual volumes which can be recovered exist or not (S215) and, if determining that one or more virtual volumes which can be recovered exist, performs the processing of the virtual volume recovery analysis program 116 (S216) or, if determining that one or more virtual volumes which can be recovered do not exist, terminates the processing of this routine.

Next, the processing of the virtual volume recovery analysis program 116 in the management server 308 is described with reference to the flowchart of FIG. 32.

Figure 31:
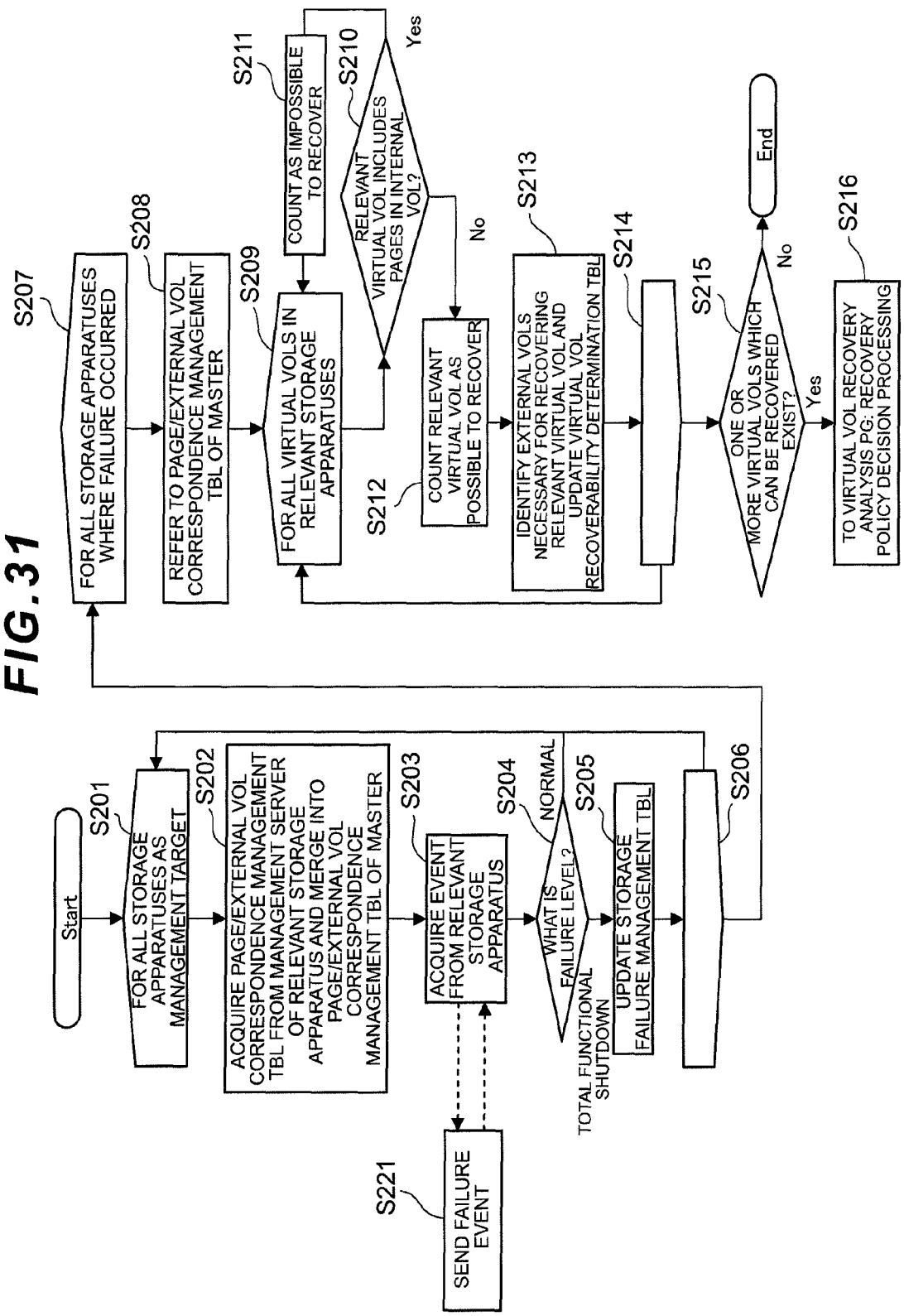
FIG. 31 is a flowchart explaining the processing of the virtual volume recovery analysis program.

This processing shows the concrete contents of step S216 in FIG. 31.

Firstly, the processor 312 refers to the virtual volume recoverability determination table 322 shown in FIG. 29 (S231), decides a recovery plan for all the virtual volumes which can be recovered (S232) and, for all the virtual volumes which can be recovered, repeats the processing of steps from S232 to S244.

As more specifically described, the processor 312 identifies an external storage apparatus which provides pool volumes from the page/external volume correspondence management table (refer to FIG. 13) 106 (S233), and determines whether the relevant external storage apparatus comprises the capacity virtualization function (the processing function by starting up the capacity virtualization control program) or not (S234). If the external storage apparatus does not comprise the capacity virtualization function, the processor 312 determines whether the storage apparatus comprising the external connection function and the capacity virtualization function exists or not (S235) and, if determining that [no storage apparatus of that type] exists, considers the relevant virtual volume to be impossible to recover (S236), and returns to the processing of step S232.

Meanwhile, at step S235, if determining that the storage apparatus comprising the external connection function and the capacity virtualization function exists, the processor 312, for example, considers the storage apparatus 304 to be an external connection function for recovery providing storage, externally connects the recovery target pool volumes (S237), and determines whether the existing pool can be used or not (S238).

The processor 312, if determining that no pool exists in the storage apparatus 304, newly creates a pool in the storage apparatus 304 (S239) or, if an existing pool, for example, the pool 428 is available, newly creates a virtual volume 448 in the pool 428 (S240), and performs the processing for switching the connection from the host computer connected to the virtual volume to be recovered to the newly created virtual volume 448 (S241).

For example, if the virtual volume 420 is considered to be the virtual volume to be recovered, the processor 312 outputs an instruction to the host computer 12 for switching the path connecting the virtual volume 420 and the host volume 408 to the path connecting the host volume 408 and the virtual volume 448.

Next, the processor 312 writes the decided plan to the virtual volume recovery policy table 324, updates the virtual volume recovery policy table 324 (S242), outputs the plan to the management I/F (GUI/CLI) and the log file (S243), and then, performs the processing of the virtual volume recovery control program 118 (S248).

Figure 33:
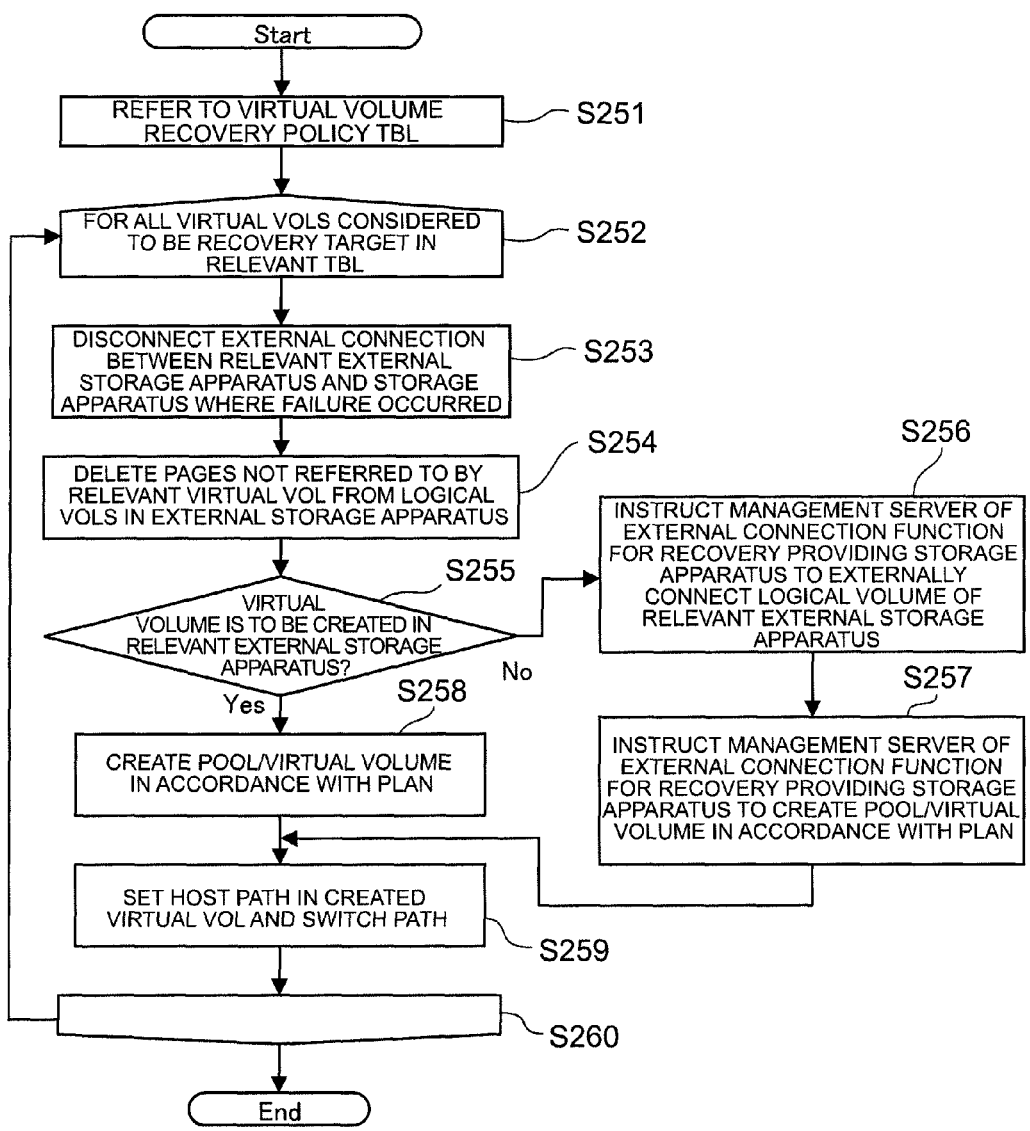
FIG. 33 is a flowchart explaining the processing of the virtual volume recovery control program.

Next, the processing of the virtual volume recovery control program 118 is described with reference to the flowchart of FIG. 33.

Figure 32:
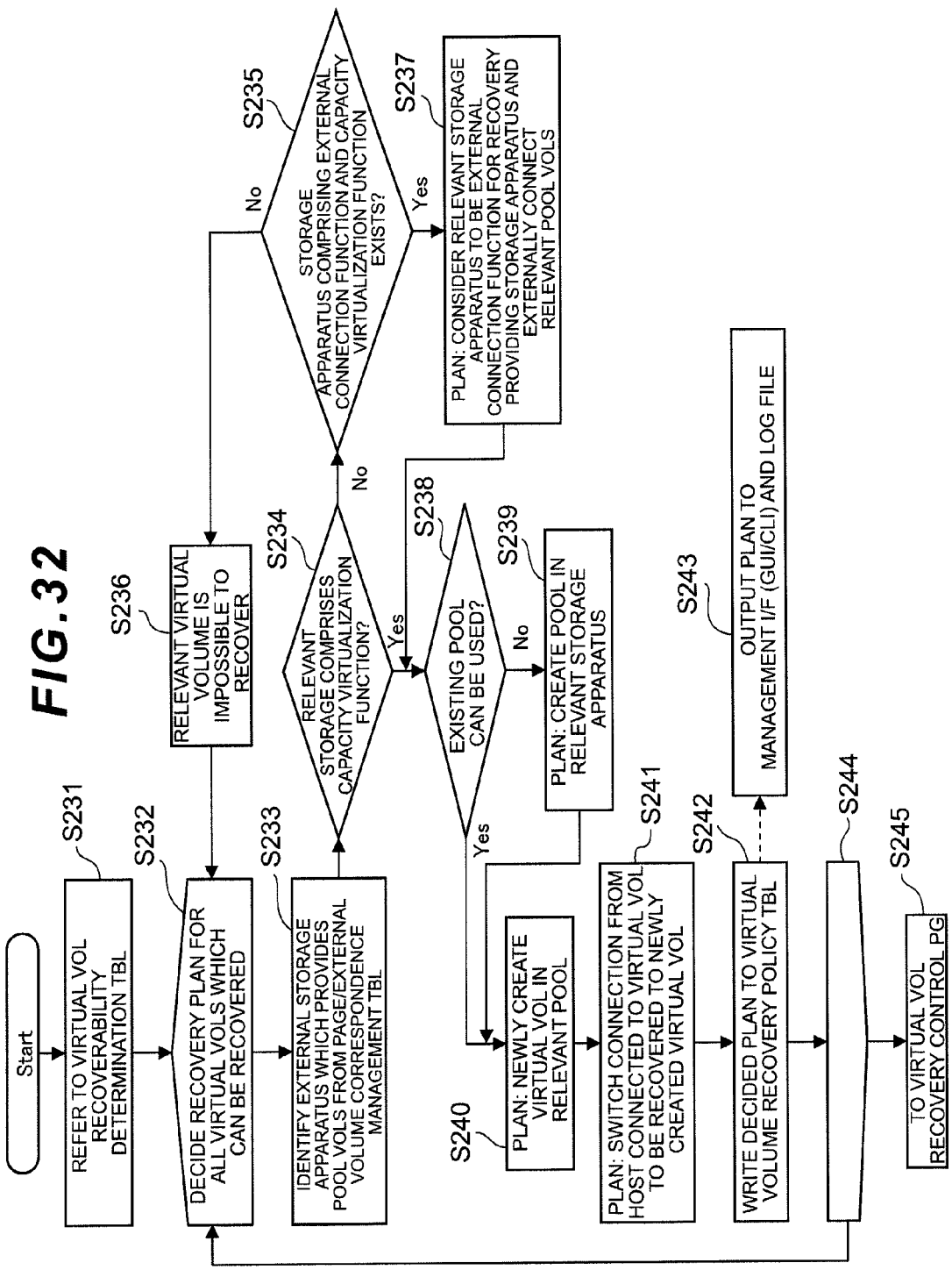
FIG. 32 is a flowchart explaining the processing of the virtual volume recovery analysis program.

This processing shows the concrete contents of step S245 in FIG. 32.

Firstly, the processor 312 refers to the virtual volume recovery policy table 324 (S251) and, for all the virtual volumes considered to be the recovery target in the virtual volume recovery policy table 324, repeats the processing of steps from S252 to S260.

As more specifically described, the processor 312, for the virtual volume as the recovery target, disconnects the external connection between the external storage apparatus described in the external storage apparatus field 376 and the storage apparatus where the failure occurred (S253), deletes the pages which do not have to be referred to by the virtual volume from the logical volumes in the external storage apparatus (S254), and determines whether it is necessary to create a virtual volume in the external storage apparatus or not (S255).

If determining at step S255 that it is not necessary to create a virtual volume in the external storage apparatus, the processor 312 instructs the management server of the external connection function for recovery providing storage apparatus to externally connect the logical volume 440 of the relevant external storage apparatus 302 (S256), and furthermore issues an instruction for creating a pool/virtual volume in accordance with the plan to the storage apparatus 304 (S257). In this case, the management server 308 is the management server of the external connection function for recovery providing storage apparatus, and therefore the management server 308 itself performs the processing of steps S256 and S257.

Meanwhile, if, at step S255, determining to create a virtual volume in the external storage apparatus, the processor 312 creates a pool/virtual volume in accordance with the plan (S258), sets a host path in the created virtual volume as well as outputs an instruction for switching the path to the host computer 12 (S259) and, on condition that the processing is completed for all the virtual volumes, terminates the processing of this routine.

According to this embodiment, even if an unusual status occurs in the storage apparatus 16, by storing the configuration information indicating the correspondence relationship between the external volumes 438 and the virtual volume 420 in the management server 308, the management server 308, in accordance with the stored configuration information, can recover the data of the pages including the external volumes 450 in the pool volumes; that is, the data of the virtual volume 420 to which the external volumes 438 were assigned.

Figure 34:
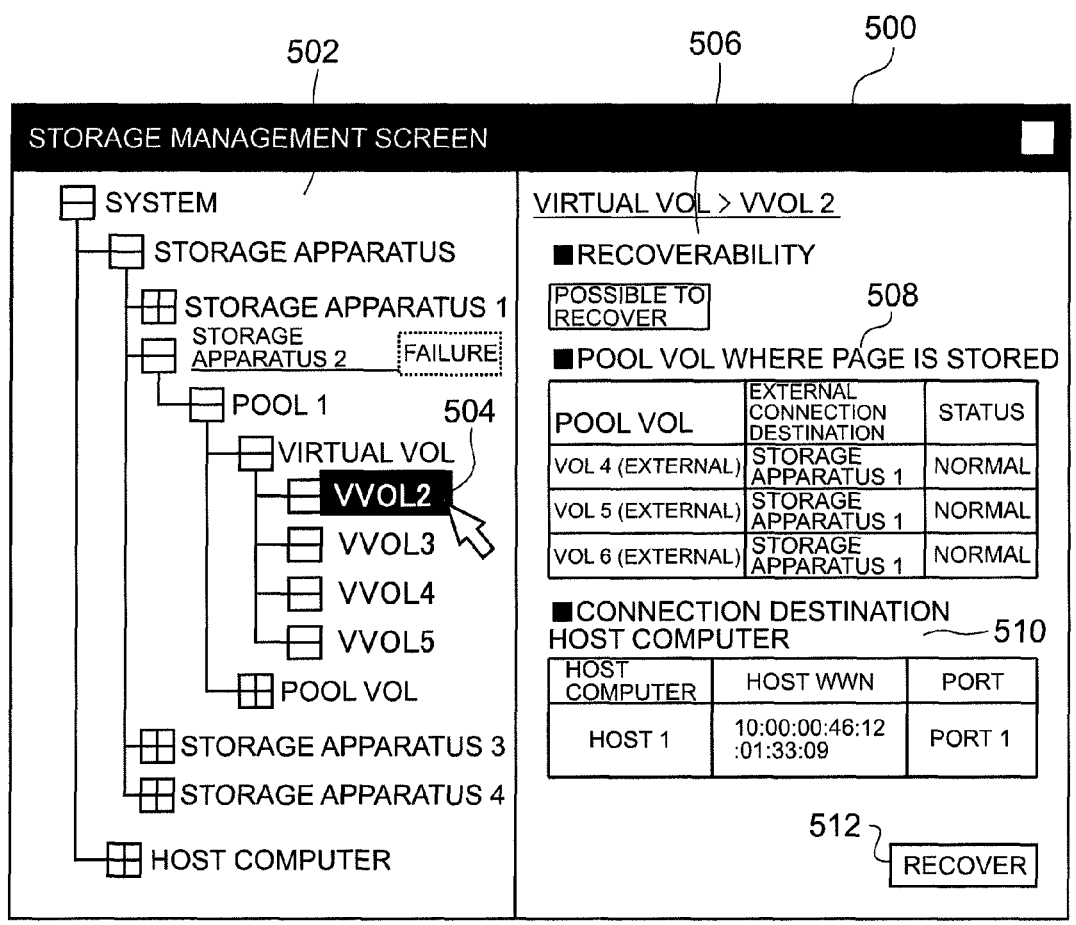
FIG. 34 is a diagram explaining a display example of a storage management screen.

Next, FIG. 34 shows a display example of a storage management screen 500.

The storage management screen 500 comprises a system display screen 502 for displaying the configuration of the computer system and, on the system configuration screen 502, the names of the storage apparatuses and the host computers configuring the computer system are displayed in a tree configuration.

At this step, if a failure occurs in the "storage apparatus 2," the configuration of the "pool 1" belonging to this "storage apparatus 2" is displayed and, if the administrator clicks the identifier of any of the virtual volumes, for example, the mark of the VVOL 2 504, on the failure display screen 504, as the contents of the virtual volume where the failure occurred, for example, the recoverability information 506, the pool volume information 508 of [the pool volume] where the pages are stored, and the connection destination host computer information 510 are displayed. At this time, if the administrator clicks the "recover" button 512, as the next storage management screen, the storage management screen 520 shown in FIG. 35 is displayed.

Figure 35:
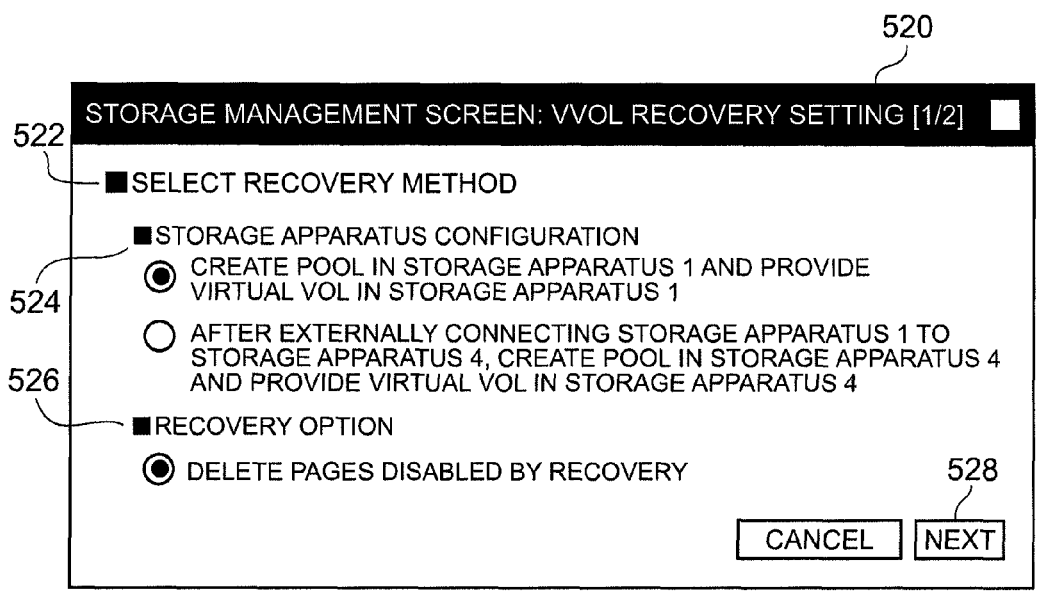
FIG. 35 is a diagram explaining another display example of a storage screen.

The storage management screen 520 shown in FIG. 35 is configured as a virtual volume recovery setting screen and, on this storage management screen 520, the "select recovery method" information 522 is displayed and furthermore the "storage apparatus configuration" information 524 and the "recovery option" information 526 are respectively displayed.

In this case, as for the "storage apparatus configuration" information 524, either "Create pool in storage apparatus 1 and provide virtual volume in storage apparatus 1" or "After externally connecting storage apparatus 1 to storage apparatus 4, create pool in storage apparatus 4 and provide virtual volume in storage apparatus 4" can be selected.

Meanwhile, as the "recovery option" information 526, if "Delete pages disabled by recovery" is selected, the processing for deleting the pages which are disabled by the recovery will be performed. Subsequently, if the administrator clicks the "next" button 528, as the next storage screen, the storage management screen 540 shown in FIG. 36 is displayed.

Figure 36:
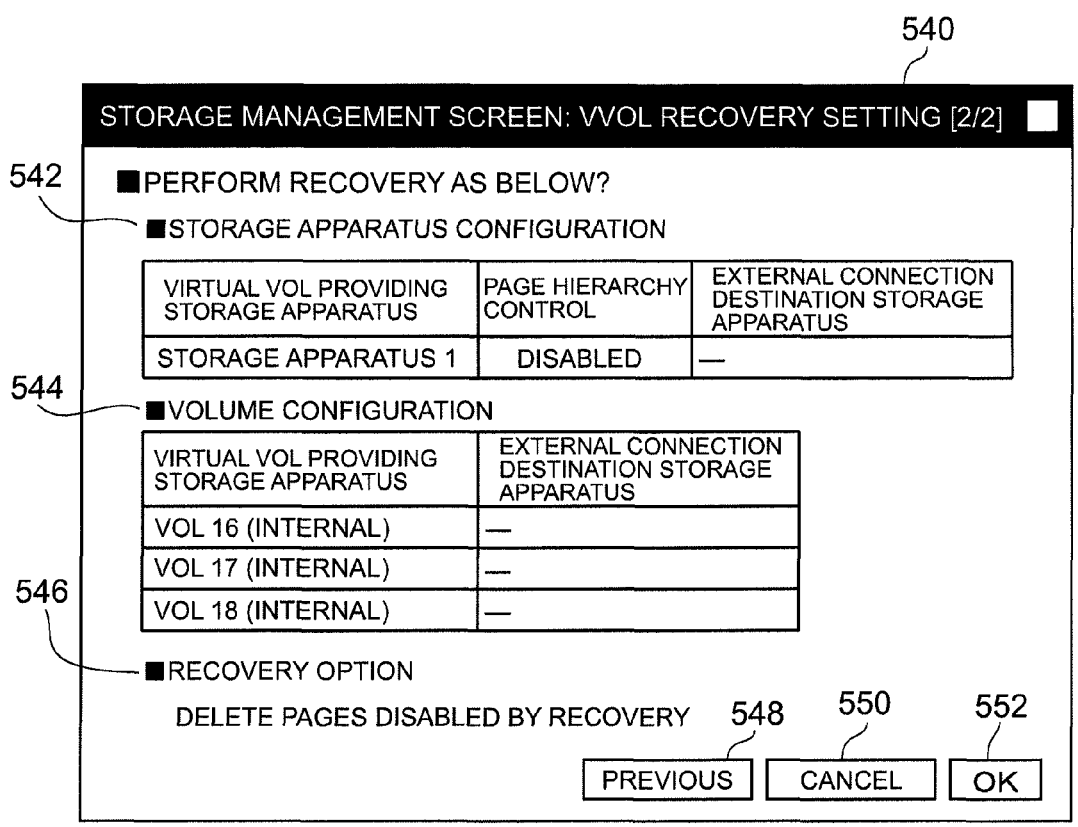
FIG. 36 is a diagram explaining another display example of a storage screen.

The storage management screen 540 shown in FIG. 36 is the screen for performing the virtual volume recovery setting and, on this storage management screen 540, the "storage apparatus configuration" information 542, the "volume configuration" information 544, and the "recovery option" information 546 are respectively displayed. If the administrator confirms the contents of the displayed information and clicks the "previous" button 548, [the processing] returns to the previous screen while, if the "cancel" button 550 is clicked, the selected information is cancelled and, if the "OK" button 552 is clicked, the processing will be performed in accordance with the contents displayed on the storage management screen 540.

REFERENCE SIGN LIST 10, 12, 300 Host computer, 14, 16, 302, 304 Storage apparatus, 18, 20, 306, 308 Management server, 22 Operation network, 26 Management network, 54 to 60 Virtual volume, 62 Pool, 64, 66, 68 Logical volume, 70 External volume, 134, 136, 138, 140, 400 to 410 Host volume, 424 to 428 Pool, 430, 432 Logical volume, 434 External volume, 436 Logical volume, 438 External volume, 440, 442 Logical volume.

The invention claimed is:

1. A computer system, comprising:
a plurality of storage apparatuses including at least a first storage apparatus with a first storage device and a second storage apparatus with a second storage device; and
a plurality of management servers connected to each of the storage apparatuses via a management network for respectively managing each of the storage apparatuses,
wherein the first storage apparatus is connected to one or more than two host computers as an access request source via a first communication network, and includes a first controller that is connected to the second storage apparatus via the first communication network or a second communication network,
wherein the first controller
manages one or more than two first virtual volumes with a virtual storage area as an access target of the access request source,
assigns, a first internal logical volume configuring a logical storage area of the first storage device or an external logical volume associated with a second internal logical volume configuring a logical storage area of the second storage device, to any one of the first virtual volumes in response to an access request from the access request source,
controls I/O processing of data to and from the first storage device upon access to the first internal logical volume, and
controls I/O processing of data to and from the second storage device upon access to the external logical volume,
wherein at least one management server among the plurality of management servers:
determines existence or non-existence of abnormality of the first storage apparatus by sending and receiving information to and from the storage apparatus or the management server connected to the management network,
and
creates, when the first storage apparatus is subject to abnormality, a second virtual volume in the second storage apparatus as a normal storage apparatus among the storage apparatuses belonging to the plurality of storage apparatuses, and
associates the second virtual volume in the second storage apparatus with the second internal logical volume in the second storage apparatus, which used to be assigned to the first storage apparatus as the external logical volume, based on configuration information shared between the first storage apparatus and the second storage apparatus, including a corresponding relationship between the first virtual volume and the internal and external logical volumes.

2. The computer system according to claim 1,
wherein the plurality of management servers comprise a first management server for managing the second storage apparatus, wherewith the one management server is configured from the second management server,
wherein the first controller includes a first pool for storing a plurality of pages corresponding to a plurality of blocks configuring a virtual storage area of the first virtual volume, assigns a storage area from the internal logical volume as an internal pool volume and assigns a storage area from the external logical volume as an external pool volume to each page of the first pool, and manages the first virtual volume by associating each block of the first virtual volume with each page of the pool, and
wherein the second management server sends and receives information to and from the first controller and stores, as configuration information showing the correspondence of the first virtual volume and the external logical volume, configuration information showing the correspondence of the external pool volume, which was assigned to any one of the pages of the pool, and the first virtual volume, and, if the first storage apparatus is subject to abnormality and it is determined that the substance of the abnormality is a total functional shutdown of a system including the first storage apparatus and the first management server, the second management server determines that the entire first virtual volume is unusable, creates a second pool in the second storage apparatus, forms a plurality of pages in the second pool, associates the second virtual volume with the external pool volume based on the configuration information that was stored prior to the occurrence of the abnormality for each page of the second pool, provides the second virtual volume associated with the external logical volume as a new access target to an access request source, among the access request sources, which had the first virtual volume associated with the external logical volume as an access target, and server for managing the first storage apparatus and a second management server instructs the switching of a path from the first virtual volume to the second virtual volume.

3. The computer system according to claim 1,
wherein the one management server sends and receives information to and from the first controller and stores configuration information showing the correspondence of the first virtual volume and the external logical volume, and, if the first storage apparatus is subject to abnormality and it is determined that the substance of the abnormality is a total functional shutdown of a system including the management server managing the first storage apparatus and the first management server, the one management server determines that the entire first virtual volume is unusable, and associates the second virtual volume with an internal logical volume in the second storage apparatus, which was assigned to the first storage apparatus as the external logical volume, based on the configuration information that was stored prior to the occurrence of the abnormality.

4. The computer system according to claim 1,
wherein the one management server sends and receives information to and from the first controller and stores configuration information showing the correspondence of the first virtual volume and the external logical volume, and, if the first storage apparatus is subject to abnormality and it is determined that the substance of the abnormality is a link down associated with a failure of the second communication network connecting the first storage apparatus and the second storage apparatus, the one management server determines that, among the first virtual volumes, those assigned to the external volume are unusable, and associates the second virtual volume with an internal logical volume in the second storage apparatus, which was assigned to the first storage apparatus as the external logical volume, based on the configuration information that was stored prior to the occurrence of the abnormality.

5. The computer system according to claim 1, wherein, if the first storage apparatus is subject to abnormality and it is determined that the substance of the abnormality is a line QoS (Quality of Service) violation associated with a communication failure of the first communication network connecting the first storage apparatus and the second storage apparatus, the one management server sends and receives information to and from the first controller to acquire the configuration information from the first controller, and associates the second virtual volume with an internal logical volume in the second storage apparatus, which was assigned to the first storage apparatus as the external logical volume, based on the acquired configuration information.

6. The computer system according to claim 1,
wherein the first controller includes a first pool for storing a plurality of pages corresponding to a plurality of blocks configuring a virtual storage area of the first virtual volume, assigns a storage area from the internal logical volume as an internal pool volume and assigns a storage area from the external logical volume as an external pool volume to each page of the first pool, and manages the first virtual volume by associating each block of the first virtual volume with each page of the pool, and
wherein the one management server sends and receives information to and from the first controller and stores, as configuration information showing the correspondence of the first virtual volume and the external logical volume, configuration information showing the correspondence of the external pool volume, which was assigned to any one of the pages of the pool, and the first virtual volume, and, if the first storage apparatus is subject to abnormality and it is determined that the substance of the abnormality is a total functional shutdown of a system including the management server managing the first storage apparatus and the first management server, the one management server determines that the entire first virtual volume is unusable, creates a second pool in the second storage apparatus, forms a plurality of pages in the second pool, and associates the second virtual volume with an internal logical volume in the second storage apparatus, which was assigned to the first storage apparatus as the external pool volume, based on the configuration information that was stored prior to the occurrence of the abnormality for each page of the second pool.

7. The computer system according to claim 1,
wherein the first controller includes a first pool for storing a plurality of pages corresponding to a plurality of blocks configuring a virtual storage area of the first virtual volume, assigns a storage area from the internal logical volume as an internal pool volume and assigns a storage area from the external logical volume as an external pool volume to each page of the first pool, and manages the first virtual volume by associating each block of the first virtual volume with each page of the pool, and
wherein the one management server sends and receives information to and from the first controller and stores, as configuration information showing the correspondence of the first virtual volume and the external logical volume, configuration information showing the correspondence of the external pool volume, which was assigned to any one of the pages of the pool, and the first virtual volume, and, if the first storage apparatus is subject to abnormality and it is determined that the substance of the abnormality is a link down associated with a failure of the second communication network connecting the first storage apparatus and the second storage apparatus, the one management server determines that, among the first virtual volumes, those in which the external pool volume is assigned to a page of the pool are unusable, forms a second pool in the second storage apparatus, forms a plurality of pages in the second pool, and associates the second virtual volume with an internal logical volume in the second storage apparatus, which was assigned to the first storage apparatus as the external pool volume, based on the configuration information that was stored prior to the occurrence of the abnormality for each page of the second pool.

8. The computer system according to claim 1,
wherein the first controller includes a first pool for storing a plurality of pages corresponding to a plurality of blocks configuring a virtual storage area of the first virtual volume, assigns a storage area from the internal logical volume as an internal pool volume and assigns a storage area from the external logical volume as an external pool volume to each page of the first pool, and manages the first virtual volume by associating each block of the first virtual volume with each page of the pool, and
wherein, if the first storage apparatus is subject to abnormality and it is determined that the substance of the abnormality is a line QoS (Quality of Service) violation associated with a communication failure of the first communication network connecting the first storage apparatus and the second storage apparatus, the one management server forms a second pool in the second storage apparatus, forms a plurality of pages in the second pool, sends and receives information to and from the first controller to acquire, as the configuration information from the first controller, configuration information showing the correspondence of each of the pool volumes, which was assigned to any one of the pages of the pool, and the first virtual volume, and associates the second virtual volume with each of the pool volumes based on the acquired configuration information for each page of the second pool.

9. The computer system according to claim 8, wherein, if the internal pool volume exists in the pool volume assigned to each page of the second pool, the one management server deletes the internal pool volume from the relevant page.

10. A method of controlling a computer system comprising:
a plurality of storage apparatuses including at least a first storage apparatus with a first storage device and a second storage apparatus with a second storage device; and
a plurality of management servers connected to each of the storage apparatuses via a management network for respectively managing each of the storage apparatuses,
wherein the first storage apparatus is connected to one or more than two host computers as an access request source via a first communication network, and includes a first controller that is connected to the second storage apparatus via the first communication network or a second communication network,
wherein the first controller manages one or more than two first virtual volumes with a virtual storage area as an access target of the access request source, assigns, a first internal logical volume configuring a logical storage area of the first storage device or an external logical volume associated with a second interval logical volume configuring a logical storage area of the second storage device, to any one of the first virtual volumes in response to an access request from the access request source, controls I/O processing of data to and from the first storage device upon access to the first internal logical volume, and controls I/O processing of data to and from the second storage device upon access to the external logical volume,
wherein at least one management server among the plurality of management servers:
determines existence or non-existence of abnormality of the first storage apparatus by sending and receiving information to and from the storage apparatus or the management server connected to the management network, and
creates when the first storage apparatus is subject to abnormality, a second virtual volume in the second storage apparatus as a normal storage apparatus among the storage apparatuses belonging to the plurality of storage apparatuses, and associates the second virtual volume in the second storage apparatus with the second internal logical volume in the second storage apparatus, which use to be assigned to the first storage apparatus as the external logical volume, based on configuration information shared between the first storage apparatus and the second storage apparatus including a corresponding relationship between the first virtual volume and the interval and external logical volumes.

11. The method of controlling a computer system according to claim 10,
wherein the one management server:
sends and receives information to and from the first controller and stores configuration information showing the correspondence of the first virtual volume and the external logical volume;
if the first storage apparatus is subject to abnormality and it is determined that the substance of the abnormality is a total functional shutdown of a system including the management server managing the first storage apparatus and the first management server, the one management server determines that the entire first virtual volume is unusable;
associates the second virtual volume with an internal logical volume in the second storage apparatus, which was assigned to the first storage apparatus as the external logical volume, based on the configuration information that was stored prior to the occurrence of the abnormality; and
provides the second virtual volume associated with the external logical volume as a new access target to an access request source, among the access request sources, which had the first virtual volume associated with the external logical volume as an access target, and instructs the switching of a path from the first virtual volume to the second virtual volume.

12. The method of controlling a computer system according to claim 10, wherein the one management server:
sends and receives information to and from the first controller and stores configuration information showing the correspondence of the first virtual volume and the external logical volume;
if the first storage apparatus is subject to abnormality and it is determined that the substance of the abnormality is a link down associated with a failure of the second communication network connecting the first storage apparatus and the second storage apparatus, the one management server determines that, among the first virtual volumes, those assigned to the external volume are unusable;
associates the second virtual volume with an internal logical volume in the second storage apparatus, which was assigned to the first storage apparatus as the external logical volume, based on the configuration information that was stored prior to the occurrence of the abnormality; and
provides the second virtual volume associated with the external logical volume as a new access target to an access request source, among the access request sources, which had the first virtual volume associated with the external logical volume as an access target, and instructs the switching of a path from the first virtual volume to the second virtual volume.

13. The method of controlling a computer system according to claim 10,
wherein the one management server:
if the first storage apparatus is subject to abnormality and it is determined that the substance of the abnormality is a line QoS (Quality of Service) violation associated with a communication failure of the first communication network connecting the first storage apparatus and the second storage apparatus, sends and receives information to and from the first controller to acquire the configuration information from the first controller;

associates the second virtual volume with an internal logical volume in the second storage apparatus, which was assigned to the first storage apparatus as the external logical volume, based on the acquired configuration information; and provides the second virtual volume associated with the external logical volume as a new access target to an access request source, among the access request sources, which had the first virtual volume associated with the external logical volume as an access target, and instructs the switching of a path from the first virtual volume to the second virtual volume.

* * * * *